United States Patent
Ajax et al.

(10) Patent No.: US 10,928,084 B2
(45) Date of Patent: Feb. 23, 2021

(54) MULTI-FUNCTION THERMOSTAT WITH INTELLIGENT SUPPLY FAN CONTROL FOR MAXIMIZING AIR QUALITY AND OPTIMIZING ENERGY USAGE

(71) Applicant: Johnson Controls Technology Company, Auburn Hills, MI (US)

(72) Inventors: Michael J. Ajax, Milwaukee, WI (US); Joseph R. Ribbich, Waukesha, WI (US); Joseph M. Ruggiero, Lemont, IL (US)

(73) Assignee: Johnson Controls Technology Company, Auburn Hills, MI (US)

( * ) Notice: Subject to any disclaimer, the term of this patent is extended or adjusted under 35 U.S.C. 154(b) by 44 days.

(21) Appl. No.: 15/953,162

(22) Filed: Apr. 13, 2018

(65) Prior Publication Data

US 2018/0299159 A1    Oct. 18, 2018

Related U.S. Application Data

(60) Provisional application No. 62/485,774, filed on Apr. 14, 2017.

(51) Int. Cl.
*F24F 11/46* (2018.01)
*F24F 11/00* (2018.01)
(Continued)

(52) U.S. Cl.
CPC .......... *F24F 11/46* (2018.01); *F24F 11/0001* (2013.01); *G05B 19/042* (2013.01);
(Continued)

(58) Field of Classification Search
CPC ........ F24F 11/0001; F24F 11/46; F24F 11/56; F24F 11/64; F24F 11/65;
(Continued)

(56) References Cited

U.S. PATENT DOCUMENTS

| 5,082,173 A | 1/1992 | Poehlman et al. |
| 5,232,152 A | 8/1993 | Tsang |

(Continued)

FOREIGN PATENT DOCUMENTS

| WO | WO 2017/031688 | 3/2012 |
| WO | WO 2012/047938 A2 | 4/2012 |
| WO | WO 2016/102521 | 6/2016 |

OTHER PUBLICATIONS

Search Report for International Application No. PCT/US2018/027629, dated Aug. 9, 2018, 7 pages.

*Primary Examiner* — Chun Cao
(74) *Attorney, Agent, or Firm* — Foley & Lardner LLP

(57) ABSTRACT

An HVAC system within a building including an HVAC device having a blower fan, a number of sensors, and a control device. The control device has a processor that is configured to receive a request to operate the blower fan. The control device is further configured to determine an air quality value based on measurements provided by the sensors, and a runtime of the blower fan within a previous time frame. The control device is also configured to operate the blower fan based on the determined air quality value and the determined runtime of the blower fan within the previous time frame.

20 Claims, 12 Drawing Sheets

(51) Int. Cl.
*G05B 19/042* (2006.01)
*F24F 11/56* (2018.01)
*F24F 11/64* (2018.01)
*F24F 11/65* (2018.01)
*F24F 110/10* (2018.01)
*F24F 110/20* (2018.01)
*F24F 110/22* (2018.01)
*F24F 110/66* (2018.01)
*F24F 110/70* (2018.01)
*G05B 15/02* (2006.01)

(52) U.S. Cl.
CPC ............... *F24F 11/56* (2018.01); *F24F 11/64* (2018.01); *F24F 11/65* (2018.01); *F24F 2011/0002* (2013.01); *F24F 2110/10* (2018.01); *F24F 2110/20* (2018.01); *F24F 2110/22* (2018.01); *F24F 2110/66* (2018.01); *F24F 2110/70* (2018.01); *G05B 15/02* (2013.01); *G05B 2219/2614* (2013.01); *Y02B 30/70* (2013.01)

(58) Field of Classification Search
CPC ........... F24F 2011/0002; F24F 2110/10; F24F 2110/20; F24F 2110/22; F24F 2110/66; F24F 2110/70; G05B 15/02; G05B 19/042; G05B 2219/2614
See application file for complete search history.

(56) References Cited

U.S. PATENT DOCUMENTS

| | | |
|---|---|---|
| 5,364,026 A | 11/1994 | Kundert |
| 5,433,377 A | 7/1995 | Sodo et al. |
| 5,482,210 A | 1/1996 | Carey et al. |
| 5,547,107 A | 8/1996 | Boiardi |
| 5,902,183 A | 5/1999 | D'Souza |
| 6,119,680 A | 9/2000 | Barritt |
| 6,161,764 A | 12/2000 | Jatnieks |
| 6,318,639 B1 | 11/2001 | Toth |
| 6,398,118 B1 | 6/2002 | Rosen et al. |
| 6,431,268 B1 | 8/2002 | Rudd |
| 6,467,695 B1 | 10/2002 | Riley et al. |
| 6,514,138 B2 | 2/2003 | Estepp |
| 6,920,874 B1 | 7/2005 | Siegel |
| 6,935,570 B2 | 8/2005 | Acker, Jr. |
| 6,941,193 B2 | 9/2005 | Frecska et al. |
| 6,988,671 B2 | 1/2006 | Deluca |
| 7,044,397 B2 | 5/2006 | Bartlett et al. |
| 7,113,086 B2 | 9/2006 | Shorrock |
| 7,222,494 B2 | 5/2007 | Peterson et al. |
| 7,226,496 B2 | 6/2007 | Ehlers |
| 7,325,748 B2 | 2/2008 | Acker, Jr. |
| 7,434,413 B2 | 10/2008 | Wruck |
| 7,758,408 B2 | 7/2010 | Hagentoft |
| 7,788,936 B2 | 9/2010 | Peterson et al. |
| 7,793,510 B2 | 9/2010 | Perry et al. |
| 7,798,418 B1 | 9/2010 | Rudd |
| 8,091,796 B2 | 1/2012 | Amundson et al. |
| 8,100,746 B2 | 1/2012 | Heidel et al. |
| 8,141,373 B2 | 3/2012 | Peterson et al. |
| 8,165,721 B2 | 4/2012 | Petit |
| 8,185,244 B2 | 5/2012 | Wolfson |
| 8,190,367 B2 | 5/2012 | Bassa |
| 8,214,085 B2 | 7/2012 | Boudreau et al. |
| 8,219,249 B2 | 7/2012 | Harrod et al. |
| 8,463,344 B2 | 6/2013 | Williams |
| 8,511,578 B2 | 8/2013 | Has |
| 8,543,244 B2 | 9/2013 | Keeling et al. |
| 8,555,662 B2 | 10/2013 | Peterson et al. |
| 8,640,970 B2 | 2/2014 | Dorendorf |
| 8,694,164 B2 | 4/2014 | Grohman et al. |
| 8,695,690 B2* | 4/2014 | Ali ............... G06F 1/203 165/293 |
| 8,768,521 B2 | 7/2014 | Amundson et al. |
| 8,874,497 B2 | 10/2014 | Raestik et al. |
| 8,924,026 B2 | 12/2014 | Federspiel et al. |
| 8,939,827 B2 | 1/2015 | Boudreau et al. |
| 9,056,539 B2 | 6/2015 | Mirza et al. |
| 9,291,358 B2 | 3/2016 | Federspiel et al. |
| 9,471,069 B2 | 10/2016 | Amundson et al. |
| 9,494,337 B2 | 11/2016 | Ragg |
| 9,506,665 B2 | 11/2016 | Dorendorf et al. |
| 9,506,668 B2 | 11/2016 | Sinur et al. |
| 9,594,384 B2 | 3/2017 | Bergman et al. |
| 9,618,224 B2 | 4/2017 | Emmons et al. |
| 9,671,125 B2 | 6/2017 | Mowris et al. |
| 9,677,772 B2 | 6/2017 | Siegel et al. |
| 9,696,052 B2 | 7/2017 | Malchiondo et al. |
| 9,810,441 B2 | 11/2017 | Dean-Hendricks et al. |
| 2002/0072322 A1* | 6/2002 | Sharp ............... F24F 11/0001 454/229 |
| 2003/0181158 A1 | 9/2003 | Schell et al. |
| 2004/0025604 A1* | 2/2004 | Call ............... G01N 1/2273 73/863.22 |
| 2005/0224069 A1 | 10/2005 | Patil et al. |
| 2006/0004492 A1 | 1/2006 | Terlson et al. |
| 2006/0213000 A1 | 9/2006 | Kimble et al. |
| 2007/0062513 A1 | 3/2007 | Gagas |
| 2007/0264927 A1 | 11/2007 | Choi et al. |
| 2008/0011863 A1 | 1/2008 | Roux et al. |
| 2008/0102744 A1 | 5/2008 | Moore et al. |
| 2009/0001179 A1 | 1/2009 | Dempsey |
| 2010/0107076 A1 | 4/2010 | Grohman et al. |
| 2010/0282076 A1* | 11/2010 | Fox ............... B01D 46/0086 95/25 |
| 2011/0010652 A1 | 1/2011 | Wallaert |
| 2011/0010653 A1 | 1/2011 | Wallaert et al. |
| 2011/0223850 A1 | 9/2011 | Narayanamurthy et al. |
| 2012/0023428 A1 | 1/2012 | Kennard et al. |
| 2012/0037666 A1 | 2/2012 | Miller |
| 2012/0190294 A1 | 7/2012 | Heidel et al. |
| 2012/0245740 A1 | 9/2012 | Raestik et al. |
| 2012/0252345 A1 | 10/2012 | Wolfson |
| 2013/0040550 A1 | 2/2013 | Pfister et al. |
| 2013/0226352 A1 | 8/2013 | Dean-Hendricks et al. |
| 2014/0099872 A1 | 4/2014 | Matsumoto et al. |
| 2014/0130574 A1 | 5/2014 | Happ et al. |
| 2014/0188287 A1 | 7/2014 | Sabata |
| 2014/0202449 A1 | 7/2014 | Snyder |
| 2015/0032264 A1 | 1/2015 | Emmons et al. |
| 2015/0148963 A1 | 5/2015 | Klein et al. |
| 2015/0345819 A1 | 12/2015 | Ostrovsky et al. |
| 2015/0369503 A1 | 12/2015 | Flaherty et al. |
| 2015/0369507 A1 | 12/2015 | Flaherty et al. |
| 2016/0069580 A1 | 3/2016 | Crisa |
| 2016/0116177 A1 | 4/2016 | Sikora et al. |
| 2016/0146769 A1* | 5/2016 | Zhang ............... G01N 33/0063 73/31.02 |
| 2016/0231014 A1 | 8/2016 | Ro et al. |
| 2016/0377298 A1 | 12/2016 | Livchak et al. |
| 2017/0052545 A1 | 2/2017 | Cortez |
| 2017/0067239 A1 | 3/2017 | Dorendorf et al. |
| 2017/0130981 A1 | 5/2017 | Willette et al. |
| 2017/0136206 A1 | 5/2017 | Pillai et al. |
| 2017/0139386 A1 | 5/2017 | Pillai et al. |
| 2017/0159954 A1 | 6/2017 | Bergman et al. |
| 2017/0176030 A1 | 6/2017 | Emmons et al. |
| 2017/0350611 A1* | 12/2017 | Su ............... F24F 11/30 |

* cited by examiner

MULTI-FUNCTION THERMOSTAT WITH INTELLIGENT SUPPLY FAN CONTROL FOR MAXIMIZING AIR QUALITY AND OPTIMIZING ENERGY USAGE

CROSS-REFERENCE TO RELATED PATENT APPLICATIONS

This application claims the benefit of and priority to U.S. Provisional Patent Application No. 62/485,774 filed Apr. 14, 2017, the entire disclosure of which is incorporated by reference herein.

BACKGROUND

The present invention relates generally to thermostats and more particularly to the improved control of a building or space's heating, ventilating, and air conditioning (HVAC) system through the use of a multi-function thermostat to maximize air quality and energy usage.

A thermostat is, in general, a component of an HVAC control system. Traditional thermostats sense the temperature of a system and control components of the HVAC in order to maintain a setpoint. A thermostat may be designed to control a heating or cooling system or an air conditioner. Thermostats are manufactured in many ways, and use a variety of sensors to measure temperature and other desired parameters of a system.

Conventional thermostats are configured for one-way communication to connected components, and to control HVAC systems by turning on or off certain components or by regulating flow. Each thermostat may include a temperature sensor and a user interface. The user interface typically includes a display for presenting information to a user and one or more user interface elements for receiving input from a user. To control the temperature of a building or space, a user adjusts the setpoint via the thermostat's user interface.

While some HVAC control systems may attempt to improve internal air quality, these systems generally use air quality control algorithms that focus on controlling the fresh air intake strictly based on an indoor air quality only.

SUMMARY

One implementation of the present disclosure is an HVAC system within a building including an HVAC device having a blower fan, a number of sensors, and a control device. The control device has a processor that is configured to receive a request to operate the blower fan. The control device is further configured to determine an air quality value and a runtime of the blower fan within a previous time frame. The control device is also configured to operate the blower fan based on the determined air quality value and the determined runtime of the blower fan within the previous time frame.

In some embodiments, the control device is a thermostat.

In some embodiments, the HVAC system includes a ventilator configured to ventilate outside air into the building. In other embodiments, the processor is further configured to operate the ventilator in parallel with the blower fan. The operation of the ventilator is based on a difference of two or more measured conditions being less than a user specified difference limit. The measured conditions may be an outdoor air temperature and a zone temperature. The processor may be configured to determine an indoor air quality average and operate the ventilator in parallel with the blower fan based on the indoor air quality average being determined to be below an predetermined threshold. In still further embodiments, the processor is further configured to operate the ventilator to control a humidity level of within the building.

In some embodiments, the number of sensors includes an indoor sensor and an outdoor sensor. In other embodiments, the indoor sensor is a volatile organic compound (VOC) sensor.

In some embodiments, the number of sensors includes one or more of a volatile organic compound (VOC) sensor, a carbon dioxide sensor, and a humidity sensor.

Another implementation of the present disclosure is a method of operating a blower fan in an HVAC system. The method includes receiving a request to operate the blower fan and determining an air quality value. The air quality value is determined based on measurements provided by a number of sensors. The method further includes determining a runtime of the blower fan within a previous time frame, and operating the blower fan based on the determined air quality value and the determined runtime of the blower fan within the previous time frame.

In some embodiments, the method is performed by a thermostat.

In some embodiments, the number of sensors includes an indoor sensor and an outdoor sensor. In other embodiments, the indoor sensor is a volatile organic compound (VOC) sensor.

In some embodiments, the number of sensors includes one or more of a volatile organic compound (VOC) sensor, a carbon dioxide sensor, and a humidity sensor.

Yet another implementation of the present disclosure is a thermostat configured to control a blower fan in an HVAC system. The thermostat includes a communications interface configured to receive one or more measurements from a number of sensors and a processing circuit including a processor and memory. The processor is configured to receive a request to operate the blower fan and determine a status of a smart circulation mode of the blower fan. The smart circulation mode is configured to override the request to operate the blower fan when an air quality value is determined to be above an acceptable value. The processor is further configured to operate the blower fan based at least in part on the smart circulation mode status.

In some embodiments, the processor is further configured to determine the air quality value. The air quality value is based on the one or more measurements from the number of sensors. In other embodiments, operating the blower fan is further based on the air quality value being determined to be below an acceptable value.

In some embodiments, the processor is further configured to determine a runtime of the blower fan within a previous time frame. In other embodiments, operating the blower fan is further based on the determined runtime of the blower fan within the previous time frame.

DETAILED DESCRIPTION

Overview

Referring generally to the FIGURES, a user control device is shown, according to various exemplary embodiments. The thermostat described herein may be used in any HVAC system, room, environment, or system within which it is desired to control and/or observe environmental conditions (e.g., temperature, humidity, etc.). In traditional HVAC systems, a thermostat may be adjusted by a user to control the temperature of a system.

The user control device is intended to provide the user with an ability to function as a connected smart hub. The thermostat provides an desirable user interface for other environmental controls because of its known fixed location within a space. The user control device is intended to be more personal, more efficient, and more aware than traditional thermostats.

The user control device collects data about a space and the occupants of the space with various sensors (e.g., temperature sensors, humidity sensors, acoustic sensors, optical sensors, gas and other chemical sensors, biometric sensors, motion sensors, etc.) and user inputs. The user control device may utilize data collected from a single room, multiple rooms, an entire building, or multiple buildings. The data may be analyzed locally by the user control device or may be uploaded to a remote computing system and/or the cloud for further analysis and processing.

Building Management System and HVAC System

Figure 1:
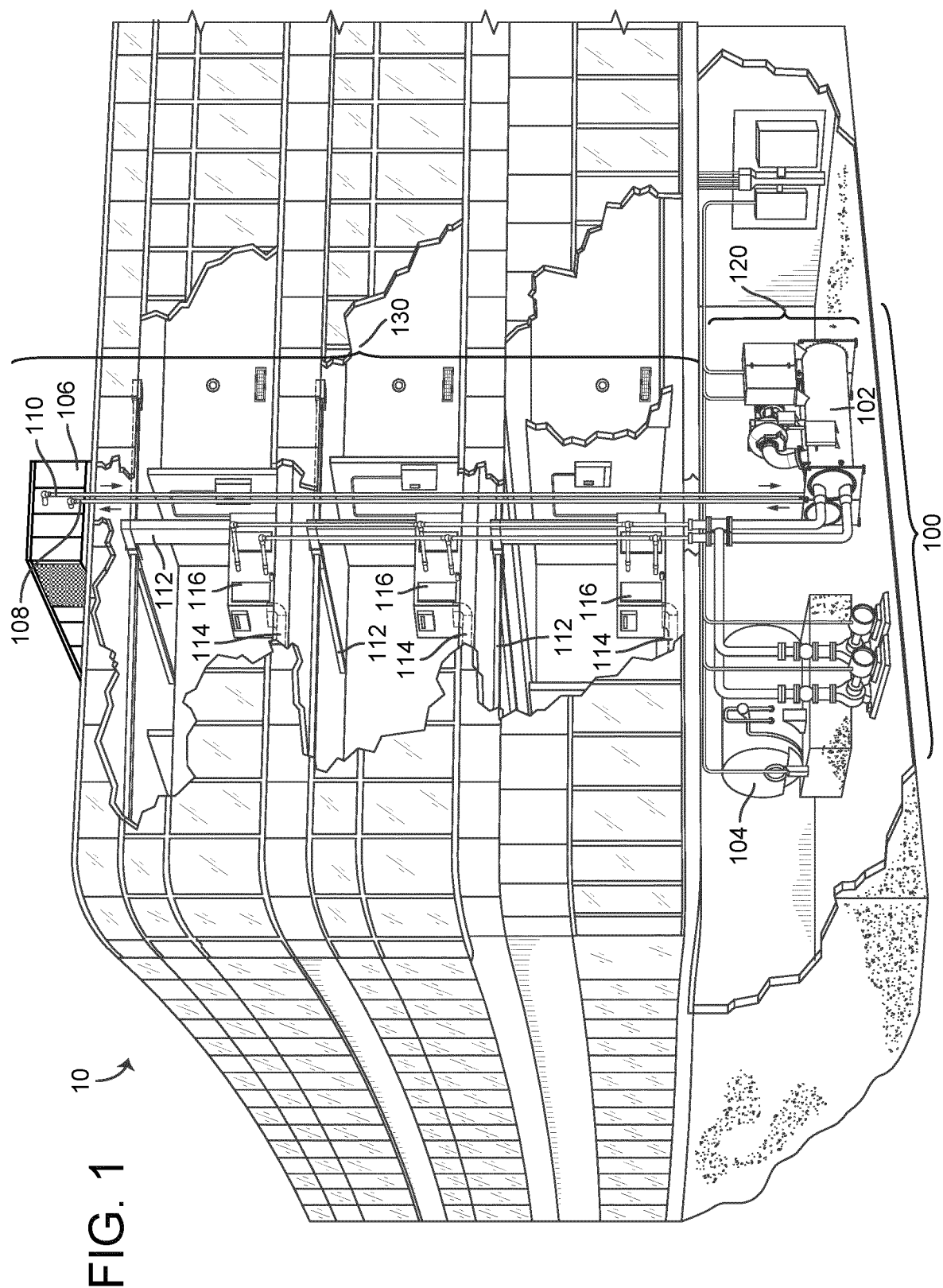
FIG. 1 is a drawing of a building equipped with a HVAC system, according to an exemplary embodiment.

Referring now to FIGS. 1-4, an exemplary building management system (BMS) and HVAC system in which the systems and methods of the present disclosure may be implemented are shown, according to an exemplary embodiment. Referring particularly to FIG. 1, a perspective view of a building 10 is shown. Building 10 is served by a BMS. A BMS is, in general, a system of devices configured to control, monitor, and manage equipment in or around a building or building area. A BMS can include, for example, a HVAC system, a security system, a lighting system, a fire alerting system, any other system that is capable of managing building functions or devices, or any combination thereof.

The BMS that serves building 10 includes an HVAC system 100. HVAC system 100 may include a plurality of HVAC devices (e.g., heaters, chillers, air handling units, pumps, fans, thermal energy storage, etc.) configured to provide heating, cooling, ventilation, or other services for building 10. For example, HVAC system 100 is shown to include a waterside system 120 and an airside system 130. Waterside system 120 may provide a heated or chilled fluid to an air handling unit of airside system 130. Airside system 130 may use the heated or chilled fluid to heat or cool an airflow provided to building 10. An exemplary waterside system and airside system which may be used in HVAC system 100 are described in greater detail with reference to FIGS. 2-3.

HVAC system 100 is shown to include a chiller 102, a boiler 104, and a rooftop air handling unit (AHU) 106. Waterside system 120 may use boiler 104 and chiller 102 to heat or cool a working fluid (e.g., water, glycol, etc.) and may circulate the working fluid to AHU 106. In various embodiments, the HVAC devices of waterside system 120 may be located in or around building 10 (as shown in FIG. 1) or at an offsite location such as a central plant (e.g., a chiller plant, a steam plant, a heat plant, etc.). The working fluid may be heated in boiler 104 or cooled in chiller 102, depending on whether heating or cooling is required in building 10. Boiler 104 may add heat to the circulated fluid, for example, by burning a combustible material (e.g., natural gas) or using an electric heating element. Chiller 102 may place the circulated fluid in a heat exchange relationship with another fluid (e.g., a refrigerant) in a heat exchanger (e.g., an evaporator) to absorb heat from the circulated fluid. The working fluid from chiller 102 and/or boiler 104 may be transported to AHU 106 via piping 108.

AHU 106 may place the working fluid in a heat exchange relationship with an airflow passing through AHU 106 (e.g., via one or more stages of cooling coils and/or heating coils). The airflow may be, for example, outside air, return air from within building 10, or a combination of both. AHU 106 may transfer heat between the airflow and the working fluid to provide heating or cooling for the airflow. For example, AHU 106 may include one or more fans or blowers configured to pass the airflow over or through a heat exchanger containing the working fluid. The working fluid may then return to chiller 102 or boiler 104 via piping 110.

Airside system 130 may deliver the airflow supplied by AHU 106 (i.e., the supply airflow) to building 10 via air supply ducts 112 and may provide return air from building 10 to AHU 106 via air return ducts 114. In some embodiments, airside system 130 includes multiple variable air volume (VAV) units 116. For example, airside system 130 is shown to include a separate VAV unit 116 on each floor or zone of building 10. VAV units 116 may include dampers or other flow control elements that can be operated to control an amount of the supply airflow provided to individual zones of building 10. In other embodiments, airside system 130 delivers the supply airflow into one or more zones of building 10 (e.g., via supply ducts 112) without using intermediate VAV units 116 or other flow control elements. AHU 106 may include various sensors (e.g., temperature sensors, pressure sensors, etc.) configured to measure attributes of the supply airflow. AHU 106 may receive input from sensors located within AHU 106 and/or within the building zone and may adjust the flow rate, temperature, or other attributes of the supply airflow through AHU 106 to achieve setpoint conditions for the building zone.

Figure 2:
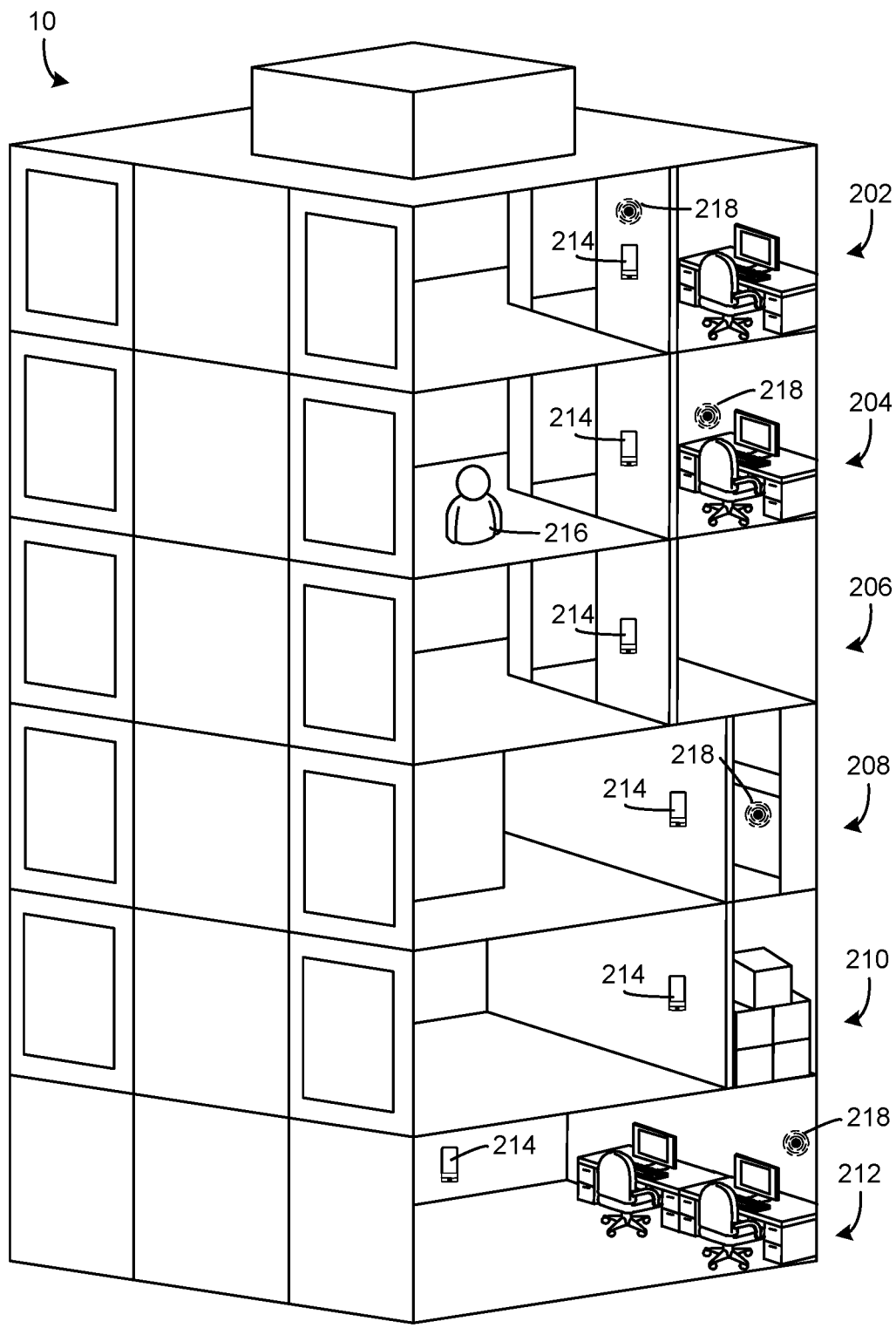
FIG. 2 is a drawing of multiple zones and floors of the building of FIG. 1 equipped with control devices, according to an exemplary embodiment.

Referring now to FIG. 2, building 10 is shown in greater detail, according to an exemplary embodiment. Building 10 may have multiple zones. In FIG. 2, building 10 has zones, 202, 204, 206, 208, 210, and 212. In building 10, the zones each correspond to a separate floor. In various embodiments, the zones of building 10 may be rooms, sections of a floor, multiple floors, etc. Each zone may have a corresponding control device 214. In some embodiments, control device 214 is at least one of a thermostat, a sensor, a controller, a display device, a concierge device, a medical monitor device, etc. Control device 214 may take input from users. The input may be an environmental setpoint, a concierge question, a payment, etc. In some embodiments, control device 214 can cause music and/or building announcements to be played in one or more of zones 202-212, cause the temperature and/or humidity to be regulated in one or more of zones 202-212, and/or any other control action.

In some embodiments, control device 214 can monitor the health of an occupant 216 of building 10. In some embodiments, control device 214 monitors heat signatures, heartrates, and any other information that can be collected from cameras, medical devices, and/or any other health related sensor. In some embodiments, building 10 has wireless transmitters 218 in each or some of zones 202-212. The wireless transmitters 218 may be routers, coordinators, and/or any other device broadcasting radio waves. In some embodiments, wireless transmitters 218 form a Wi-Fi network, a Zigbee network, a Bluetooth network, and/or any other kind of network.

In some embodiments, occupant 216 has a mobile device that can communicate with wireless transmitters 218. Control device 214 may use the signal strengths between the mobile device of occupant 216 and the wireless transmitters 218 to determine what zone the occupant is in. In some embodiments, control device 214 causes temperature setpoints, music and/or other control actions to follow occupant 216 as the occupant 216 moves from one zone to another zone (i.e., from one floor to another floor).

In some embodiments, display devices 214 are connected to a building management system, a weather server, and/or a building emergency sensor(s). In some embodiments, display devices 214 may receive emergency notifications from the building management system, the weather server, and/or the building emergency sensor(s). Based on the nature of the emergency, display devices 214 may give directions to an occupant of the building. In some embodiments, the direction may be to respond to an emergency (e.g., call the police, hide and turn the lights off, etc.) In various embodiments, the directions given to the occupant (e.g., occupant 216) may be navigation directions. For example, zone 212 may be a safe zone with no windows an individual (e.g., occupant 216). If display devices 214 determines that there are high winds around building 10, the control device 214 may direct occupants of zones 202-210 to zone 212 if zone 212 has no windows.

Figure 3:
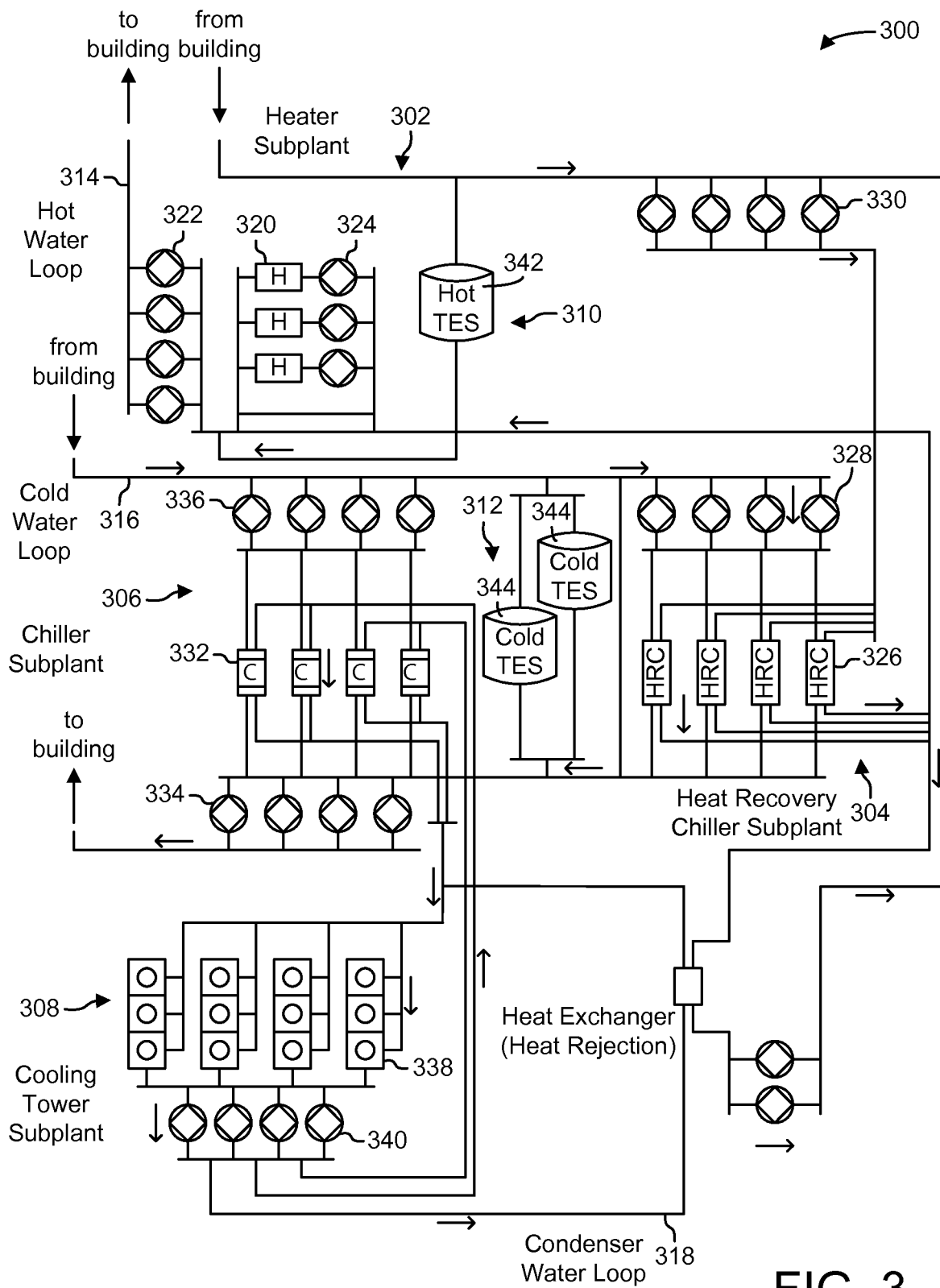
FIG. 3 is a block diagram of a waterside system that may be used in conjunction with the building of FIGS. 1-2, according to an exemplary embodiment.

Referring now to FIG. 3, a block diagram of a waterside system 300 is shown, according to an exemplary embodiment. In various embodiments, waterside system 300 may supplement or replace waterside system 120 in HVAC system 100 or may be implemented separate from HVAC system 100. When implemented in HVAC system 100, waterside system 300 may include a subset of the HVAC devices in HVAC system 100 (e.g., boiler 104, chiller 102, pumps, valves, etc.) and may operate to supply a heated or chilled fluid to AHU 106. The HVAC devices of waterside system 300 may be located within building 10 (e.g., as components of waterside system 120) or at an offsite location such as a central plant.

In FIG. 3, waterside system 300 is shown as a central plant having a plurality of subplants 302-312. Subplants 302-312 are shown to include a heater subplant 302, a heat recovery chiller subplant 304, a chiller subplant 306, a cooling tower subplant 308, a hot thermal energy storage (TES) subplant 310, and a cold thermal energy storage (TES) subplant 312. Subplants 302-312 consume resources (e.g., water, natural gas, electricity, etc.) from utilities to serve the thermal energy loads (e.g., hot water, cold water, heating, cooling, etc.) of a building or campus. For example, heater subplant 302 may be configured to heat water in a hot water loop 314 that circulates the hot water between heater subplant 302 and building 10. Chiller subplant 306 may be configured to chill water in a cold water loop 316 that circulates the cold water between chiller subplant 306 building 10. Heat recovery chiller subplant 304 may be configured to transfer heat from cold water loop 316 to hot water loop 314 to provide additional heating for the hot water and additional cooling for the cold water. Condenser water loop 318 may absorb heat from the cold water in chiller subplant 306 and reject the absorbed heat in cooling tower subplant 308 or transfer the absorbed heat to hot water loop 314. Hot TES subplant 310 and cold TES subplant 312 may store hot and cold thermal energy, respectively, for subsequent use.

Hot water loop 314 and cold water loop 316 may deliver the heated and/or chilled water to air handlers located on the rooftop of building 10 (e.g., AHU 106) or to individual floors or zones of building 10 (e.g., VAV units 116). The air handlers push air past heat exchangers (e.g., heating coils or cooling coils) through which the water flows to provide heating or cooling for the air. The heated or cooled air may be delivered to individual zones of building 10 to serve the thermal energy loads of building 10. The water then returns to subplants 302-312 to receive further heating or cooling.

Although subplants 302-312 are shown and described as heating and cooling water for circulation to a building, it is understood that any other type of working fluid (e.g., glycol, CO2, etc.) may be used in place of or in addition to water to serve the thermal energy loads. In other embodiments, subplants 302-312 may provide heating and/or cooling directly to the building or campus without requiring an intermediate heat transfer fluid. These and other variations to waterside system 300 are within the teachings of the present disclosure.

Each of subplants 302-312 may include a variety of equipment configured to facilitate the functions of the subplant. For example, heater subplant 302 is shown to include a plurality of heating elements 320 (e.g., boilers, electric heaters, etc.) configured to add heat to the hot water in hot water loop 314. Heater subplant 302 is also shown to include several pumps 322 and 324 configured to circulate the hot water in hot water loop 314 and to control the flow rate of the hot water through individual heating elements 320. Chiller subplant 306 is shown to include a plurality of chillers 332 configured to remove heat from the cold water in cold water loop 316. Chiller subplant 306 is also shown to include several pumps 334 and 336 configured to circulate the cold water in cold water loop 316 and to control the flow rate of the cold water through individual chillers 332.

Heat recovery chiller subplant 304 is shown to include a plurality of heat recovery heat exchangers 326 (e.g., refrigeration circuits) configured to transfer heat from cold water loop 316 to hot water loop 314. Heat recovery chiller subplant 304 is also shown to include several pumps 328 and 330 configured to circulate the hot water and/or cold water through heat recovery heat exchangers 326 and to control the flow rate of the water through individual heat recovery heat exchangers 226. Cooling tower subplant 208 is shown to include a plurality of cooling towers 338 configured to remove heat from the condenser water in condenser water loop 318. Cooling tower subplant 308 is also shown to include several pumps 340 configured to circulate the condenser water in condenser water loop 318 and to control the flow rate of the condenser water through individual cooling towers 338.

Hot TES subplant 310 is shown to include a hot TES tank 342 configured to store the hot water for later use. Hot TES subplant 310 may also include one or more pumps or valves configured to control the flow rate of the hot water into or out of hot TES tank 342. Cold TES subplant 312 is shown to include cold TES tanks 344 configured to store the cold water for later use. Cold TES subplant 312 may also include one or more pumps or valves configured to control the flow rate of the cold water into or out of cold TES tanks 344.

In some embodiments, one or more of the pumps in waterside system 300 (e.g., pumps 322, 324, 328, 330, 334, 336, and/or 340) or pipelines in waterside system 300 include an isolation valve associated therewith. Isolation valves may be integrated with the pumps or positioned upstream or downstream of the pumps to control the fluid flows in waterside system 300. In various embodiments, waterside system 300 may include more, fewer, or different types of devices and/or subplants based on the particular configuration of waterside system 300 and the types of loads served by waterside system 300.

Figure 4:
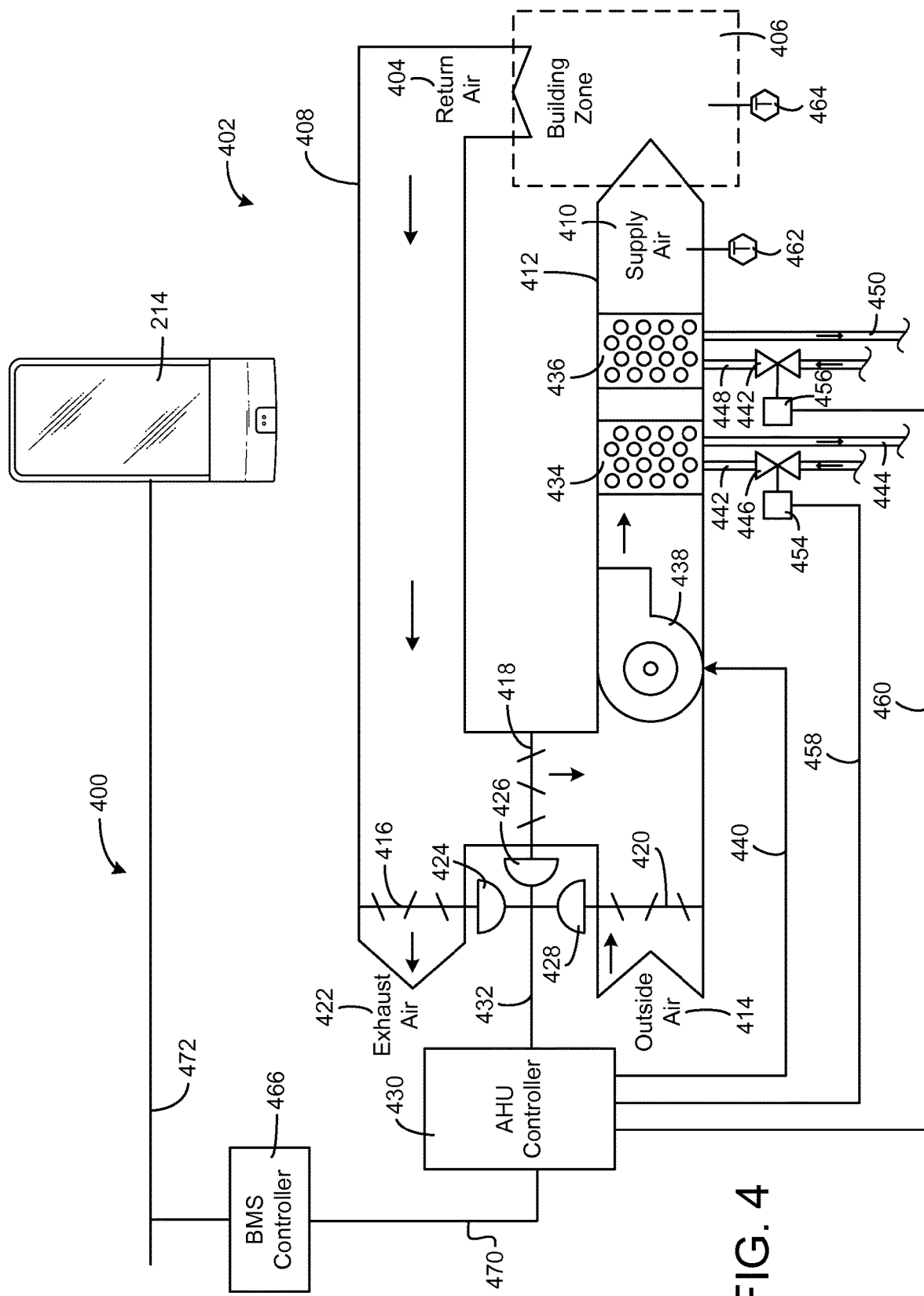
FIG. 4 is a block diagram of an airside system that may be used in conjunction with the building of FIGS. 1-2, according to an exemplary embodiment.

Referring now to FIG. 4, airside system 400 is shown to include an economizer-type air handling unit (AHU) 402. Economizer-type AHUs vary the amount of outside air and return air used by the air handling unit for heating or cooling. For example, AHU 402 may receive return air 404 from building zone 406 via return air duct 408 and may deliver supply air 410 to building zone 406 via supply air duct 412. In some embodiments, AHU 402 is a rooftop unit located on the roof of building 10 (e.g., AHU 106 as shown in FIG. 1) or otherwise positioned to receive both return air 404 and outside air 414. AHU 402 may be configured to operate exhaust air damper 416, mixing damper 418, and outside air damper 420 to control an amount of outside air 414 and return air 404 that combine to form supply air 410. Any return air 404 that does not pass through mixing damper 418 may be exhausted from AHU 402 through exhaust damper 416 as exhaust air 422.

Each of dampers 416-420 may be operated by an actuator. For example, exhaust air damper 416 may be operated by actuator 424, mixing damper 418 may be operated by actuator 426, and outside air damper 420 may be operated by actuator 428. Actuators 424-428 may communicate with an AHU controller 430 via a communications link 432. Actuators 424-428 may receive control signals from AHU controller 430 and may provide feedback signals to AHU controller 430. Feedback signals may include, for example, an indication of a current actuator or damper position, an amount of torque or force exerted by the actuator, diagnostic information (e.g., results of diagnostic tests performed by actuators 424-428), status information, commissioning information, configuration settings, calibration data, and/or other types of information or data that may be collected, stored, or used by actuators 424-428. AHU controller 430 may be an economizer controller configured to use one or more control algorithms (e.g., state-based algorithms, extremum seeking control (ESC) algorithms, proportional-integral (PI) control algorithms, proportional-integral-derivative (PID) control algorithms, model predictive control (MPC) algorithms, feedback control algorithms, etc.) to control actuators 424-428.

Still referring to FIG. 4, AHU 402 is shown to include a cooling coil 434, a heating coil 436, and a fan 438 positioned within supply air duct 412. Fan 438 may be configured to force supply air 410 through cooling coil 434 and/or heating coil 436 and provide supply air 410 to building zone 406. AHU controller 430 may communicate with fan 438 via communications link 440 to control a flow rate of supply air 410. In some embodiments, AHU controller 430 controls an amount of heating or cooling applied to supply air 410 by modulating a speed of fan 438.

Cooling coil 434 may receive a chilled fluid from waterside system 200 (e.g., from cold water loop 316) via piping 442 and may return the chilled fluid to waterside system 200 via piping 444. Valve 446 may be positioned along piping 442 or piping 444 to control a flow rate of the chilled fluid through cooling coil 434. In some embodiments, cooling coil 434 includes multiple stages of cooling coils that can be independently activated and deactivated (e.g., by AHU controller 430, by BMS controller 466, etc.) to modulate an amount of cooling applied to supply air 410.

Heating coil 436 may receive a heated fluid from waterside system 200 (e.g., from hot water loop 314) via piping 448 and may return the heated fluid to waterside system 200 via piping 450. Valve 452 may be positioned along piping 448 or piping 450 to control a flow rate of the heated fluid through heating coil 436. In some embodiments, heating coil 436 includes multiple stages of heating coils that can be independently activated and deactivated (e.g., by AHU controller 430, by BMS controller 466, etc.) to modulate an amount of heating applied to supply air 410.

Each of valves 446 and 452 may be controlled by an actuator. For example, valve 446 may be controlled by actuator 454 and valve 452 may be controlled by actuator 456. Actuators 454-456 may communicate with AHU controller 430 via communications links 458-460. Actuators 454-456 may receive control signals from AHU controller 430 and may provide feedback signals to controller 430. In some embodiments, AHU controller 430 receives a measurement of the supply air temperature from a temperature sensor 462 positioned in supply air duct 412 (e.g., downstream of cooling coil 434 and/or heating coil 436). AHU controller 430 may also receive a measurement of the temperature of building zone 406 from a temperature sensor 464 located in building zone 406.

In some embodiments, AHU controller 430 operates valves 446 and 452 via actuators 454-456 to modulate an amount of heating or cooling provided to supply air 410 (e.g., to achieve a set point temperature for supply air 410 or to maintain the temperature of supply air 410 within a set point temperature range). The positions of valves 446 and 452 affect the amount of heating or cooling provided to supply air 410 by cooling coil 434 or heating coil 436 and may correlate with the amount of energy consumed to achieve a desired supply air temperature. AHU 430 may control the temperature of supply air 410 and/or building zone 406 by activating or deactivating coils 434-436, adjusting a speed of fan 438, or a combination of both.

Still referring to FIG. 4, airside system 400 is shown to include a building management system (BMS) controller 466 and a control device 214. BMS controller 466 may include one or more computer systems (e.g., servers, supervisory controllers, subsystem controllers, etc.) that serve as system level controllers, application or data servers, head nodes, or master controllers for airside system 400, waterside system 200, HVAC system 100, and/or other controllable systems that serve building 10. BMS controller 466 may communicate with multiple downstream building systems or subsystems (e.g., HVAC system 100, a security system, a lighting system, waterside system 200, etc.) via a communications link 470 according to like or disparate protocols (e.g., LON, BACnet, etc.). In various embodiments, AHU controller 430 and BMS controller 466 may be separate (as shown in FIG. 4) or integrated. In an integrated implementation, AHU controller 430 may be a software module configured for execution by a processor of BMS controller 466.

In some embodiments, AHU controller 430 receives information from BMS controller 466 (e.g., commands, set points, operating boundaries, etc.) and provides information to BMS controller 466 (e.g., temperature measurements, valve or actuator positions, operating statuses, diagnostics, etc.). For example, AHU controller 430 may provide BMS controller 466 with temperature measurements from temperature sensors 462-464, equipment on/off states, equipment operating capacities, and/or any other information that can be used by BMS controller 466 to monitor or control a variable state or condition within building zone 406.

Control device 214 may include one or more of the user control devices. Control device 214 may include one or more human-machine interfaces or client interfaces (e.g., graphical user interfaces, reporting interfaces, text-based computer interfaces, client-facing web services, web servers that provide pages to web clients, etc.) for controlling, viewing, or otherwise interacting with HVAC system 100, its subsystems, and/or devices. Control device 214 may be a computer workstation, a client terminal, a remote or local interface, or any other type of user interface device. Control device 214 may be a stationary terminal or a mobile device. For example, control device 214 may be a desktop computer, a computer server with a user interface, a laptop computer, a tablet, a smartphone, a PDA, or any other type of mobile or non-mobile device. Control device 214 may communicate with BMS controller 466 and/or AHU controller 430 via communications link 472.

Figure 5:
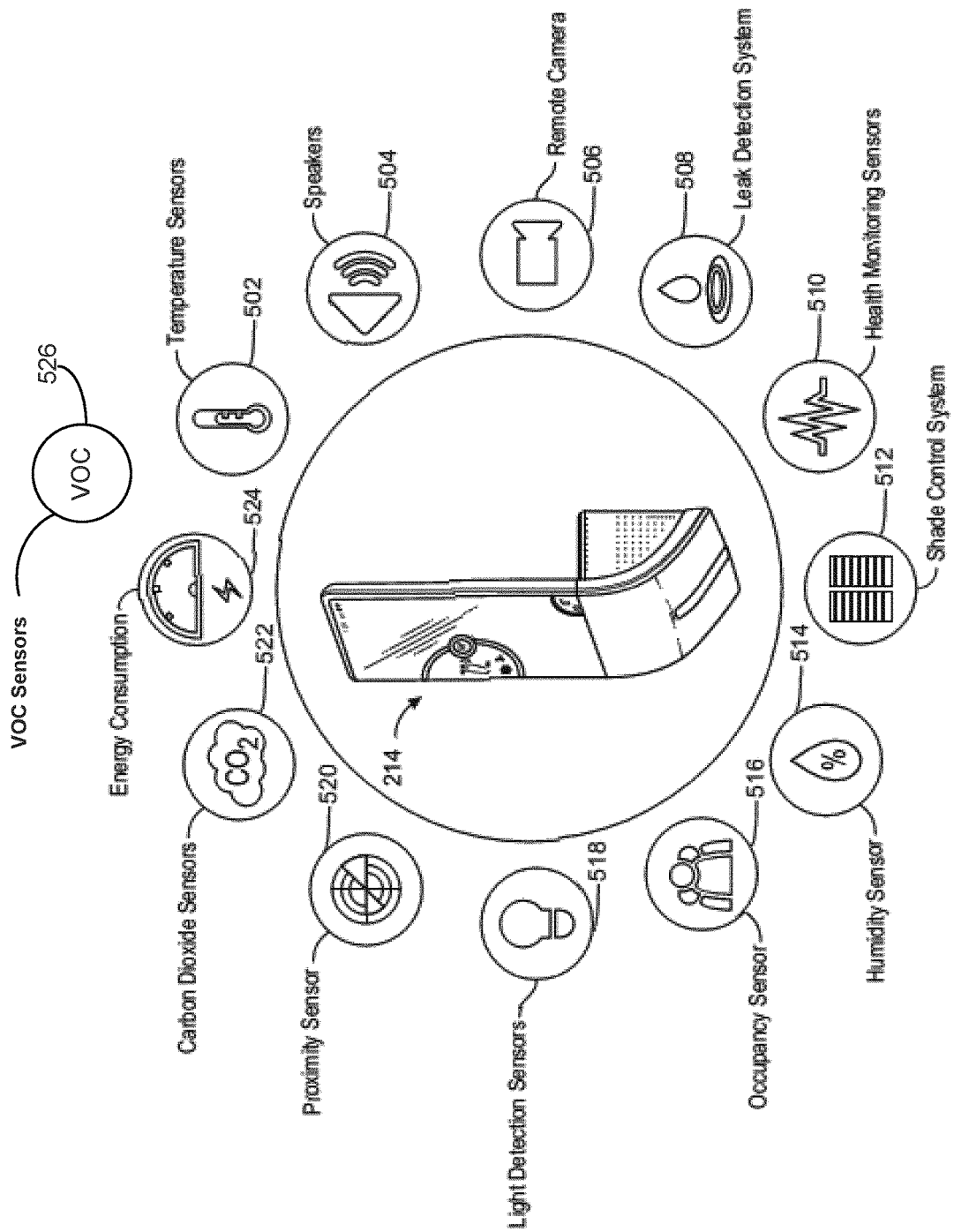
FIG. 5 is a drawing of the connections of the control device of FIG. 2 and FIG. 4, according to an exemplary embodiment.

Referring now to FIG. 5, control device 214 is shown as a connected smart hub or private area network (PAN), according to some embodiments. Control device 214 may include a variety of sensors and may be configured to communicate with a variety of external systems or devices. For example, control device 214 may include temperature sensors 502, speakers 504, leak detection system 508, health monitoring sensors 510, humidity sensors 514, occupancy sensors 516, light detection sensors 518, proximity sensor 520, carbon dioxide sensors 522, energy consumption sensors 524, volatile organic compound (VOC) sensors 526, or any of a variety of other sensors. Alternatively, control device 214 may receive input from external sensors configured to measure such variables. The external sensors may not communicate over a PAN network but may communicate with control device 214 via an IP based network and/or the Internet.

In some embodiments, the temperature sensors 502, the humidity sensors 514, the carbon dioxide sensors 522, and the VOC sensors 526 may be located at different locations within a building or home. Additionally, one or more of the temperature sensors 502, the humidity sensors 514, the carbon dioxide sensors 522, and the VOC sensors 526 may be located outside of the building or home to measure aspects of the outside air, such as outdoor temperature, outdoor humidity, carbon dioxide levels and VOC levels in the outside air. In further embodiments, the control device 214 may communicate with sensors both inside the building or home as well as outside the building or home.

In some embodiments, speakers 504 are located locally as a component of control device 214. Speakers 504 may be low power speakers used for playing audio to the immediate occupant of control device 214 and/or occupants of the zone in which control device 214 is located. In some embodiments, speakers 504 may be remote speakers connected to control device 214 via a network. In some embodiments, speakers 504 are a building audio system, an emergency alert system, and/or alarm system configured to broadcast building wide and/or zone messages or alarms.

Control device 214 may communicate with a remote camera 506, a shade control system 512, a leak detection system 508, an HVAC system, or any of a variety of other external systems or devices which may be used in a home automation system or a building automation system. Control device 214 may provide a variety of monitoring and control interfaces to allow a user to control all of the systems and devices connected to control device 214. Exemplary user interfaces and features of control device 214 are described in greater detail below.

Figure 6:
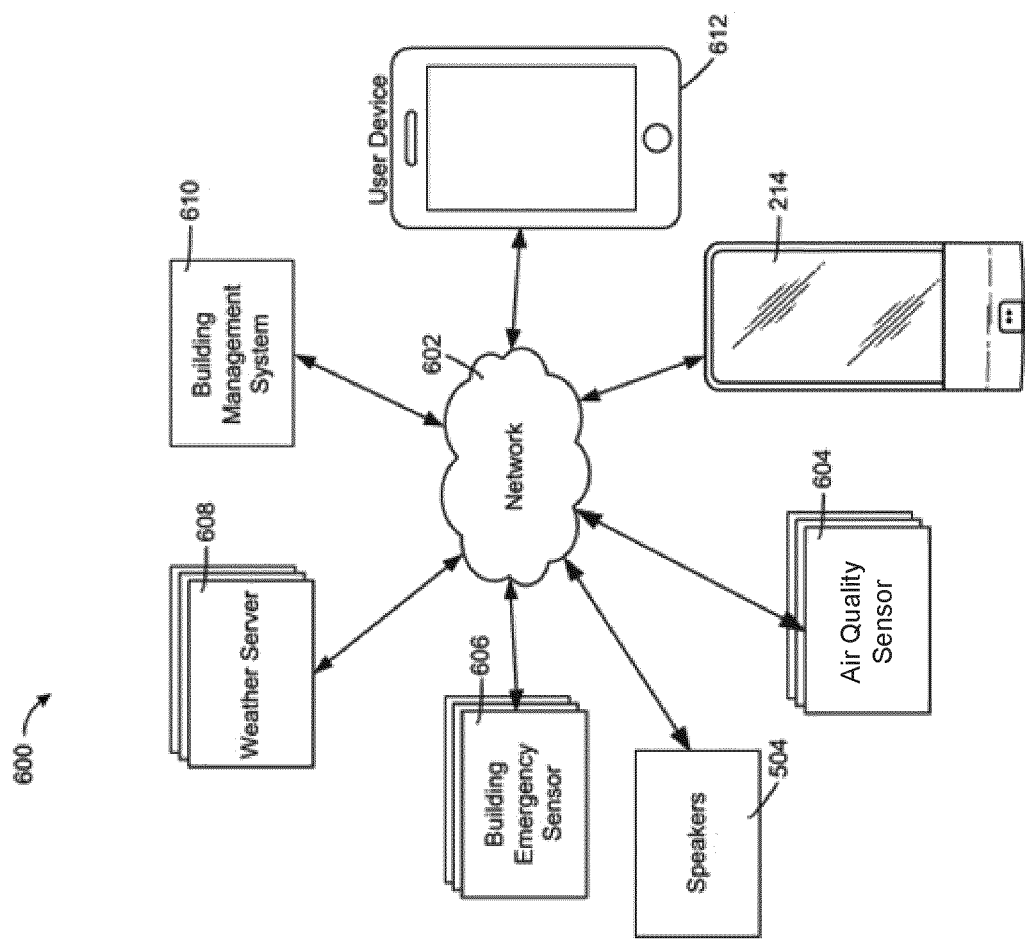
FIG. 6 is a diagram of a communications system located in the building of FIGS. 1 and 2, according to an exemplary embodiment.

Referring now to FIG. 6, a block diagram of communications system 600 is shown, according to some embodiments. System 600 can be implemented in a building (e.g. building 10) and is shown to include control device 214, network 602, air quality sensors 604, building emergency sensor(s) 606, weather server(s) 608, building management system 610, and user device 612. System 600 connects devices, systems, and servers via network 602 so that building information, HVAC controls, emergency information, navigation directions, and other information can be passed between devices (e.g., control device 214, user device 612, and/or building emergency sensor(s) 606 and servers and systems (e.g., weather server(s) 608 and/or building management system 610). In some embodiments, control device 214 is connected to speakers 504 as described with reference to FIG. 5.

In some embodiments, network 602 communicatively couples the devices, systems, and servers of system 600. In some embodiments, network 602 is at least one of and/or a combination of a Wi-Fi network, a wired Ethernet network, a Zigbee network, and a Bluetooth network. Network 602 may be a local area network or a wide area network (e.g., the Internet, a building WAN, etc.) and may use a variety of communications protocols (e.g., BACnet, IP, LON, etc.) Network 602 may include routers, modems, and/or network switches.

In some embodiments, control device 214 is configured to receive emergency information, navigation directions, occupant information, concierge information, air quality information, and any other information via network 602. In some embodiments, the information is received from building management system 610 via network 602. In other embodiments, information (e.g., sensor measurements) may be received from a cloud server via network 602. In various embodiments, the information is received from the Internet via network 602. In some embodiments, control device 214 is at least one of, or a combination of, a thermostat, a humidistat, a light controller, and any other wall mounted and/or hand held device. In some embodiments, the control device 214 is connected to one or more air quality sensors 604. Air quality sensors 604 can include temperature sensors, humidity sensors, carbon dioxide sensors, VOC sensors, etc. In some embodiments, control device 214 is connected to building emergency sensor(s) 606. In some embodiments, building emergency sensor(s) 406 are sensors which detect building emergencies. Building emergency sensor(s) 406 may be smoke detectors, carbon monoxide detectors, carbon dioxide detectors (e.g., carbon dioxide sensors 522), an emergency button (e.g., emergency pull handles, panic buttons, a manual fire alarm button and/or handle, etc.) and/or any other emergency sensor. In some embodiments, the emergency sensor(s) include actuators. The actuators may be building emergency sirens and/or building audio speaker systems (e.g., speakers 504), automatic door and/or window control (e.g., shade control system 512), and any other actuator used in a building.

In some embodiments, control device 214 may be communicatively coupled to weather server(s) 608 via network 602. In some embodiments, the control device 214 may be configured to receive weather alerts (e.g., high and low daily temperature, five day forecast, thirty day forecast, etc.) from weather server(s) 608. Control device 214 may be configured to receive emergency weather alerts (e.g., flood warnings, fire warnings, thunder storm warnings, winter storm warnings, etc.) In some embodiments, control device 214 may be configured to display emergency warnings via a user interface of control device 214 when control device 214 receives an emergency weather alert from weather server(s) 608. The control device 214 may be configured to display emergency warnings based on the data received from building emergency sensor(s) 606. In some embodiments, the control device 214 may cause a siren (e.g., speakers 504 and/or building emergency sensor(s) 606) to alert occupants of the building of an emergency, cause all doors to become locked and/or unlocked, cause an advisory message to be broadcast through the building, and control any other actuator or system necessary for responding to a building emergency. In further embodiments, the weather server(s) 608 may be configured to provide air quality information to the control device 214. For example, the weather server(s) 608 may provide air quality information such as pollen levels, mold levels, particulate levels, etc.

In some embodiments, control device 214 is configured to communicate with building management system 610 via network 602. Control device 214 may be configured to transmit environmental setpoints (e.g., temperature setpoint, humidity setpoint, etc.) to building management system 610. In some embodiments, building management system 610 may be configured to cause zones of a building (e.g., building 10) to be controlled to the setpoint received from control device 214. In further embodiments, the building management system 610 may be configured to control one or more fans or ventilators to provide air flow into and out of a building (e.g. building 10). In some embodiments, building management system 610 may be configured to control the lighting of a building. In some embodiments, building management system 610 may be configured to transmit emergency information to control device 214. In some embodiments, the emergency information is a notification of an active shooter lockdown, a tornado warning, a flood warning, a thunderstorm warning, and/or any other warning. In some embodiments, building management system 610 is connected to various weather servers or other web servers from which building management system 610 receives emergency warning information. In various embodiments, building management system is a computing system of a hotel. Building management system 610 may keep track of hotel occupancy, may relay requests to hotel staff, and/or perform any other functions of a hotel computing system.

Control device 214 is configured to communicate with user device 612 via network 602. In some embodiments, user device 612 is a smartphone, a tablet, a laptop computer, and/or any other mobile and/or stationary computing device. In some embodiments, user device 612 communicates calendar information to control device 214. In some embodiments, the calendar information is stored and/or entered by a user into calendar application 614. In some embodiments, calendar application 414 is at least one of Outlook, Google Calendar, Fantastical, Shifts, CloudCal, DigiCal, and/or any other calendar application. In some embodiments, control device 214 receives calendar information from the calendar application such as times and locations of appointments, times and locations of meetings, and/or any other information. Control device 214 may be configured to display building map direction to a user associated with user device 612 and/or any other information.

In some embodiments, a user may press a button on a user interface of control device 214 indicating a building emergency. The user may be able to indicate the type of emergency (e.g., fire, flood, active shooter, etc.) Control device 214 may communicate an alert to building management system 610, user device 612, and any other device, system, and/or server.

Figure 7:
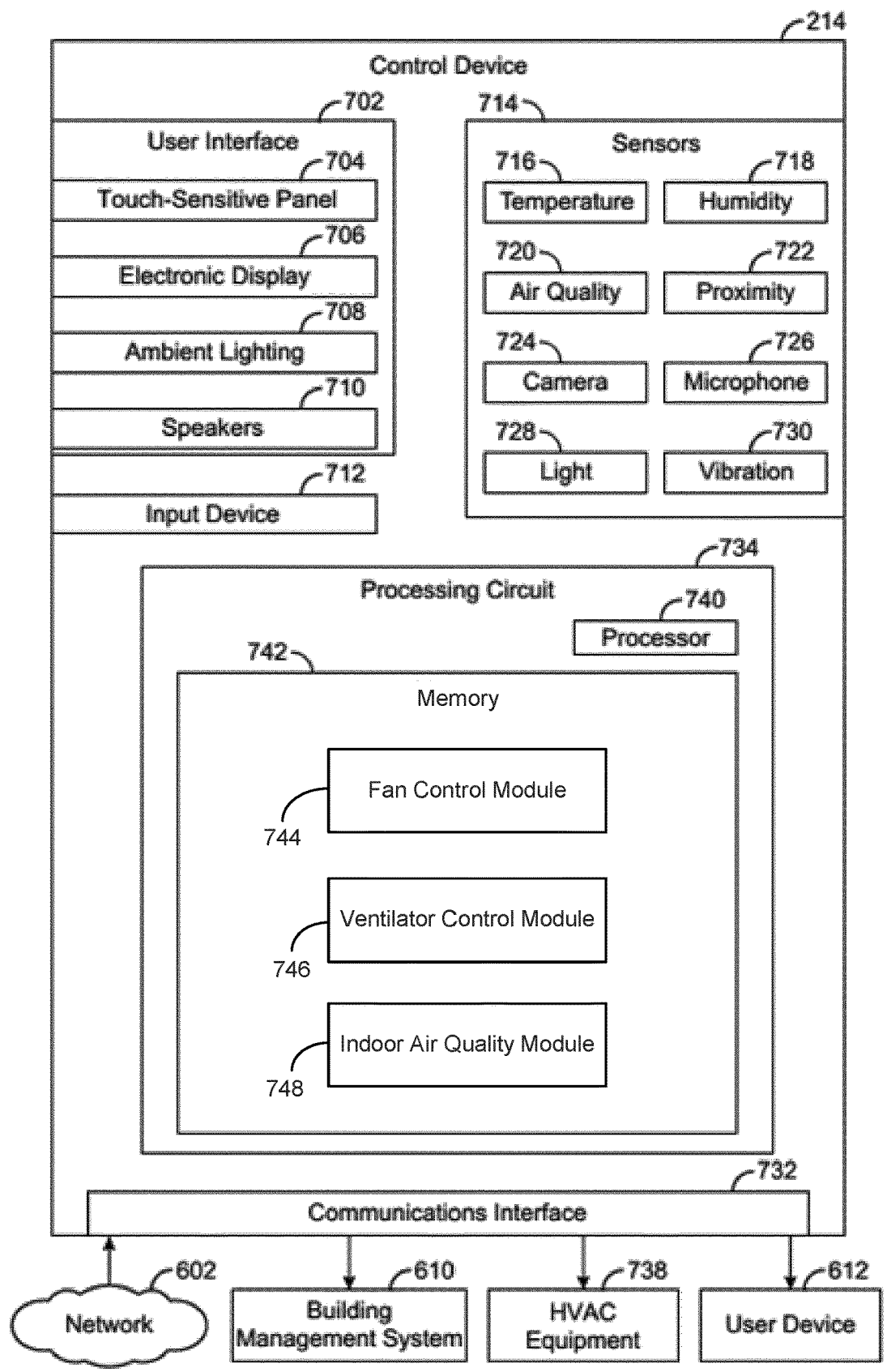
FIG. 7 is a block diagram illustrating the control device of FIGS. 2, 3, and 5 in greater detail, according to an exemplary embodiment.

Referring now to FIG. 7, a block diagram illustrating control device 214 in greater detail is shown, according to some embodiments. Control device 214 is shown to include a variety of user interface devices 702. User interface devices 702 may be configured to receive input from a user and provide output to a user in various forms. For example, user interface devices 702 are shown to include a touch-sensitive panel 704, an electronic display 706, ambient lighting 708, speakers 710 (e.g., speakers 504), and an input device 712. Input device 712 may include a microphone configured to receive voice commands from a user, a keyboard or buttons, switches, dials, or any other user-operable input device. It is contemplated that user interface devices 702 may include any type of device configured to receive input from a user and/or provide an output to a user in any of a variety of forms (e.g., touch, text, video, graphics, audio, vibration, etc.).

The control device 214 may also include, or be in communication with, a number of sensors 714. The sensors may be configured to measure a variable state or condition of the environment in which control device 214 is installed. For example, sensors 714 are shown to include a temperature sensor 716, a humidity sensor 718, an air quality sensor 720, a proximity sensor 722, a camera 724, a microphone 726, a light sensor 728, and a vibration sensor 730. The sensors 714 may be configured to measure various Air quality sensor 720 may be configured to measure any of a variety of air quality variables such as oxygen level, carbon dioxide level, carbon monoxide level, allergens, pollutants, smoke, VOCs, etc. Proximity sensor 722 may include one or more sensors configured to detect the presence of people or devices proximate to control device 214. For example, proximity sensor 722 may include a near-field communications (NFC) sensor, a radio frequency identification (RFID) sensor, a Bluetooth sensor, a capacitive proximity sensor, a biometric sensor, or any other sensor configured to detect the presence of a person or device. Camera 724 may include a visible light camera, a motion detector camera, an infrared camera, an ultraviolet camera, an optical sensor, or any other type of camera. Light sensor 728 may be configured to measure ambient light levels. Vibration sensor 730 may be configured to measure vibrations from earthquakes or other seismic activity at the location of control device 214.

Still referring to FIG. 7, control device 214 is shown to include a communications interface 732 and a processing circuit 734. Communications interface 732 may include wired or wireless interfaces (e.g., jacks, antennas, transmitters, receivers, transceivers, wire terminals, etc.) for conducting data communications with various systems, devices, or networks. For example, communications interface 732 may include an Ethernet card and port for sending and receiving data via an Ethernet-based communications network and/or a Wi-Fi transceiver for communicating via a wireless communications network. Communications interface 732 may be configured to communicate via local area networks or wide area networks (e.g., the Internet, a building WAN, etc.) and may use a variety of communications protocols (e.g., BACnet, IP, LON, etc.).

Communications interface 732 may include a network interface configured to facilitate electronic data communications between control device 214 and various external systems or devices (e.g., network 602, building management system 610, HVAC equipment 738, user device 612, etc.) For example, control device 214 may receive information from building management system 610 or HVAC equipment 738 indicating one or more measured states of the controlled building (e.g., temperature, humidity, electric loads, etc.) and one or more states of the HVAC equipment 738 (e.g., equipment status, power consumption, equipment availability, etc.). In some embodiments, HVAC equipment 738 may be lighting systems, building systems, actuators, chillers, heaters, and/or any other building equipment and/or system. Communications interface 732 may receive inputs from building management system 610 or HVAC equipment 738 and may provide operating parameters (e.g., on/off decisions, set points, etc.) to building management system 610 or HVAC equipment 738. The operating parameters may cause building management system 610 to activate, deactivate, or adjust a set point for various types of home equipment or building equipment in communication with control device 214.

Processing circuit 734 is shown to include a processor 740 and memory 742. Processor 740 may be a general purpose or specific purpose processor, an application specific integrated circuit (ASIC), one or more field programmable gate arrays (FPGAs), a group of processing components, or other suitable processing components. Processor 740 may be configured to execute computer code or instructions stored in memory 742 or received from other computer readable media (e.g., CDROM, network storage, a remote server, etc.).

Memory 742 may include one or more devices (e.g., memory units, memory devices, storage devices, etc.) for storing data and/or computer code for completing and/or facilitating the various processes described in the present disclosure. Memory 742 may include random access memory (RAM), read-only memory (ROM), hard drive storage, temporary storage, non-volatile memory, flash memory, optical memory, or any other suitable memory for storing software objects and/or computer instructions. Memory 742 may include database components, object code components, script components, or any other type of information structure for supporting the various activities and information structures described in the present disclosure. Memory 742 may be communicably connected to processor 740 via processing circuit 734 and may include computer code for executing (e.g., by processor 740) one or more processes described herein. For example, memory 742 is shown to include a fan control module 744, a ventilator control module 746, and an indoor air quality control module 748. However, other modules, such as voice command and control modules, building modules, payment modules, hotel modules, healthcare modules, occupancy modules, emergency modules and the like may also be included in the memory 742. The functions of some of these modules is described in greater detail below.

Air Quality Control

Figure 8:
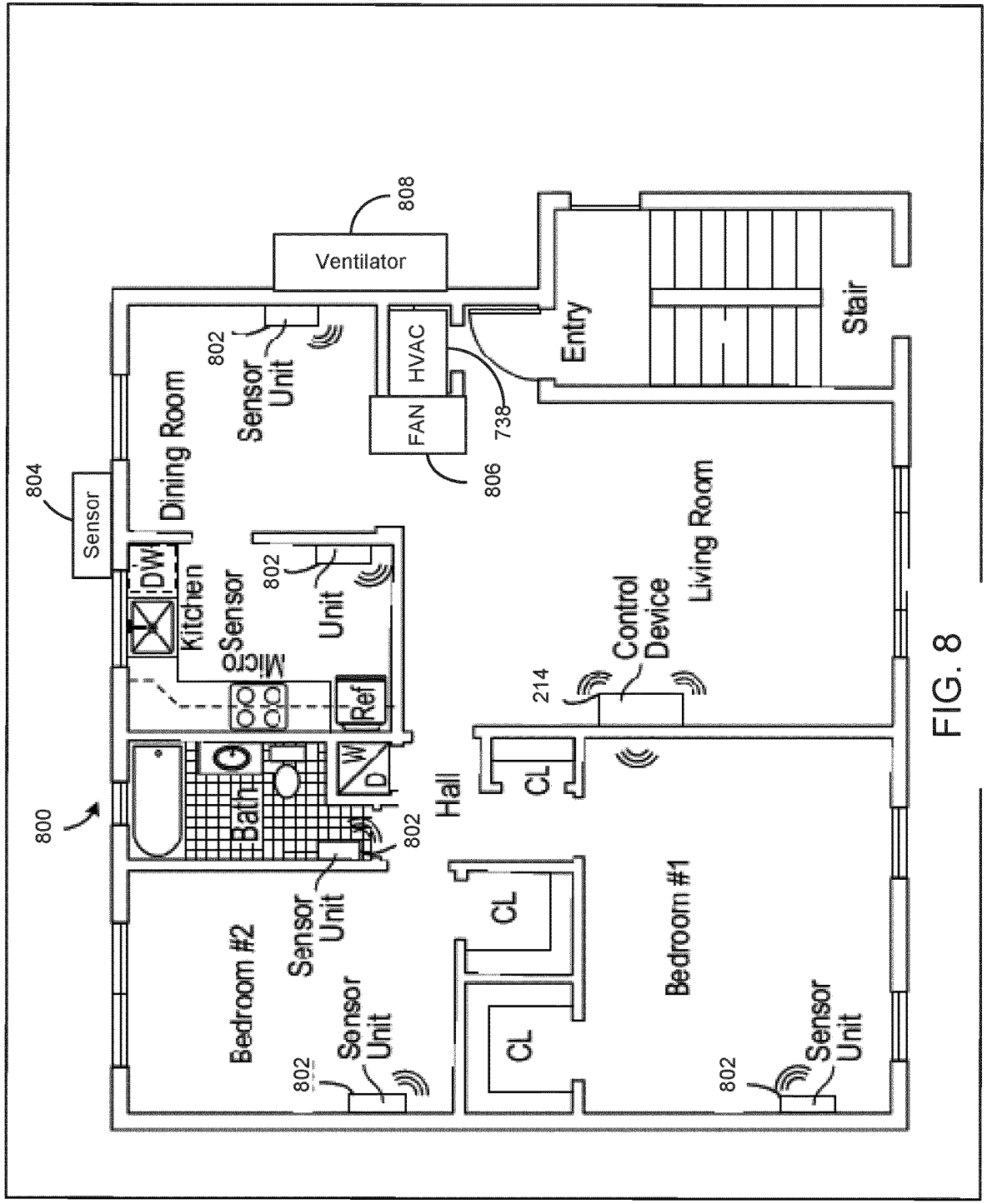
FIG. 8 is a floorplan illustration of a building, according to some embodiments.

Referring now to FIG. 8, a drawing of a floorplan of a building 800 with an HVAC equipment 738 is shown, according to some embodiments. The building 800 may include one or more indoor sensors 802, and one or more outdoor sensors 804. The building 800 may further include a control device 214, one or more blower fans 806, and one or more ventilators 808.

The indoor sensors 802 can include temperature sensors, humidity sensors, CO2 sensors, and VOC sensors. In one embodiment, the indoor sensors 802 are located at multiple points within the building 800. However, in some embodiments, one or more of the indoor sensors 802 may be integrated into the control device 214. The outdoor sensors 804 may also include temperature sensors, humidity sensors, CO2 sensors, VOC sensors and the like. Outdoor sensors 804 may further include weather sensors, light sensors, or other air quality sensors.

The blower fans 806 are configured to circulate air through the HVAC equipment 738 and throughout the building 800. In some embodiments, the blower fans 806 may be used as supply fans for the HVAC equipment 738, (e.g. supplies air to the HVAC equipment 738). The ventilator 808 is configured to ventilate the air inside the building 800 to the outside of the building 800. The ventilator 808 is further configured to bring outside air into the building 800. This can provide fresh air into the building 800, which may then be circulated by the blower fan 806. The ventilator 808 may be a traditional ventilator, an energy recovery ventilator, a heat recovery ventilator, or other applicable ventilator type. The blower fan 806 and the ventilator 808 may be controlled to provide air quality enhancements within the building. In some embodiments, the control device 214 can control the blower fan 806 and the ventilators 808 to improve the air quality within the building. The control device 214 may use data provided by the indoor sensors 802 and/or the outdoor sensors 804 to properly control the blower fan 806 and the ventilators 808, as described herein.

Figure 9:
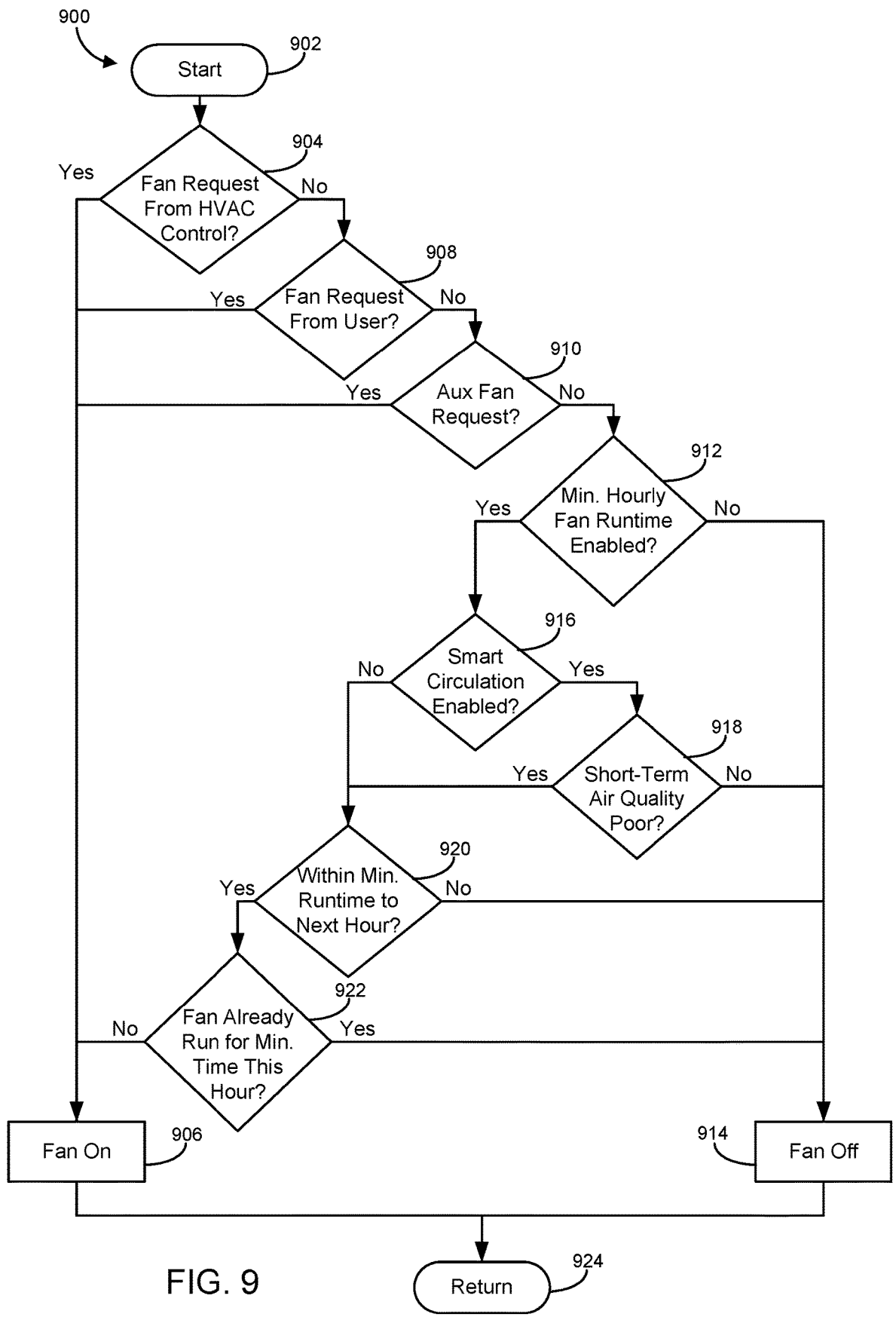
FIG. 9 is a flow diagram illustrating a process for controlling a blower fan of an HVAC system associated with the building of FIG. 8, according to some embodiments.

Turning now to FIG. 9, a process 900 for controlling the blower fan 806 is shown, according to some embodiments. In systems including both a blower fan 806 and a ventilator 808, the ventilator 808 is operated in conjunction with the blower fan 806, based on certain conditions being met as described below. The process 900 may start at process block 902. In one embodiment, the process 900 is controlled by the control device 214. Specifically, the process 900 may be controlled by the fan control module 744 of control device 214.

At process block 904, the control device 214 may determine if a fan request was received from an HVAC controller, which may occur when forced air heating or cooling is actively running in the building 800. If a fan request was received, the fan 806 is controlled to operate at process block 906. In some embodiments, the fan 806 is controlled to operate until a subsequent command is received by the control device 215 to cease operation of the fan 806. If no fan request was received from an HVAC controller, process 900 advances to process block 908 to determine whether a fan request was received from a user (e.g., a user putting the blower fan 806 in an "On" mode). If no fan request was received from a user, process 900 advances to process block 910 to determine if an auxiliary fan request was received. An auxiliary fan request may occur when a ventilator, humidifier, or dehumidifier device requests the blower fan 806 to operate in parallel with the ventilator, humidifier, or dehumidifier device. If a fan request was received, the fan 806 is controlled to operate at process block 906. If no fan request was received, process 900 advances to process block 912.

At process block 912, the control device 214 may determine if a minimum hourly runtime of the fan 806 is enabled. The fan minimum hourly runtime instructs the blower fan 806 to run for a minimum amount of time each hour. If the minimum hourly runtime of the fan 806 is not enabled at process block 912, the fan 806 may remain in an off condition at process block 914, and the process 900 may end at process block 924.

If the fan minimum hourly runtime is determined to be enabled at process block 912, the process 900 may then determine if a smart circulation mode is enabled at process block 916. The smart circulation mode may be configured to override the fan minimum runtime mode where it is determined that air quality is already above a certain quality level, as will be described in more detail below. If the smart circulation mode is not enabled, the process 900 may advance to process block 920.

If the smart circulation mode is enabled at process block 916, the process 900 may determine if the short-term air quality is poor at process block 918. In some embodiments, the air quality may be determined by the control device 214. For example, the control device 214 may evaluate data from one or more sensors, such as air quality sensors 720, to determine an air quality within the building. In some embodiments, the air quality is only evaluated when the control device 214 determines that the building 800 is occupied. The control device 214 may further evaluate air quality of the outdoor air as well. In some embodiments, the control device 214 may obtain air quality data from the indoor sensors 802 and the outdoor sensors 804. Air quality may be evaluated based on certain measurements, such as CO2 levels, VOC levels, pollen levels, temperature, humidity, etc. The control device 214 may determine that the short term air quality is poor when one or more of the measurements exceed certain threshold values. In further embodiments, the control device 214 may evaluate the air quality based on the measurements received since the last fan operation. In other embodiments, the control device 214 may do a trend, or other regression type analysis to attempt to predict the air-quality levels in the near future, e.g. before the next scheduled minimum hourly runtime command is received. If the control device 214 determines that the short term air quality is not poor, the fan 806 may remain in an off condition at process block 914, and the process may end at process block 924.

Returning to process block 916, if the control device 214 determines that smart circulation mode is not enabled, process 900 advances to process block 920 to determine whether the next minimum runtime is within the current hour. For example, if the minimum runtime per hour is ten minutes, the 'check' at process block 920 would determine a "Yes" within ten minutes of the hour (e.g. between XX:50 and XX:00 of the hour). If the minimum runtime is determined not to be within the current hour, the fan 806 may remain in an off condition at process block 914. The process 900 may then end at process block 924.

If the minimum runtime is determined to be within the next hour, the process 900 determines if the fan has already run for the minimum time during the current hour at process block 922. If the fan is determined to have already been run for the minimum time during the current hour, the fan 806 may remain in an off condition at process block 914. If the fan 806 is determined to have not been run for the minimum time during the current hour, the fan 806 can be run at process block 906, and the process can end at process block 924. As will be described in more detail below, the ventilator 808 may also be run in conjunction with the blower fan 806, where the ventilator lockout logic process 1000 provides an indication that the ventilator 808 should be run in conjunction with the blower fan 806.

Figure 10:
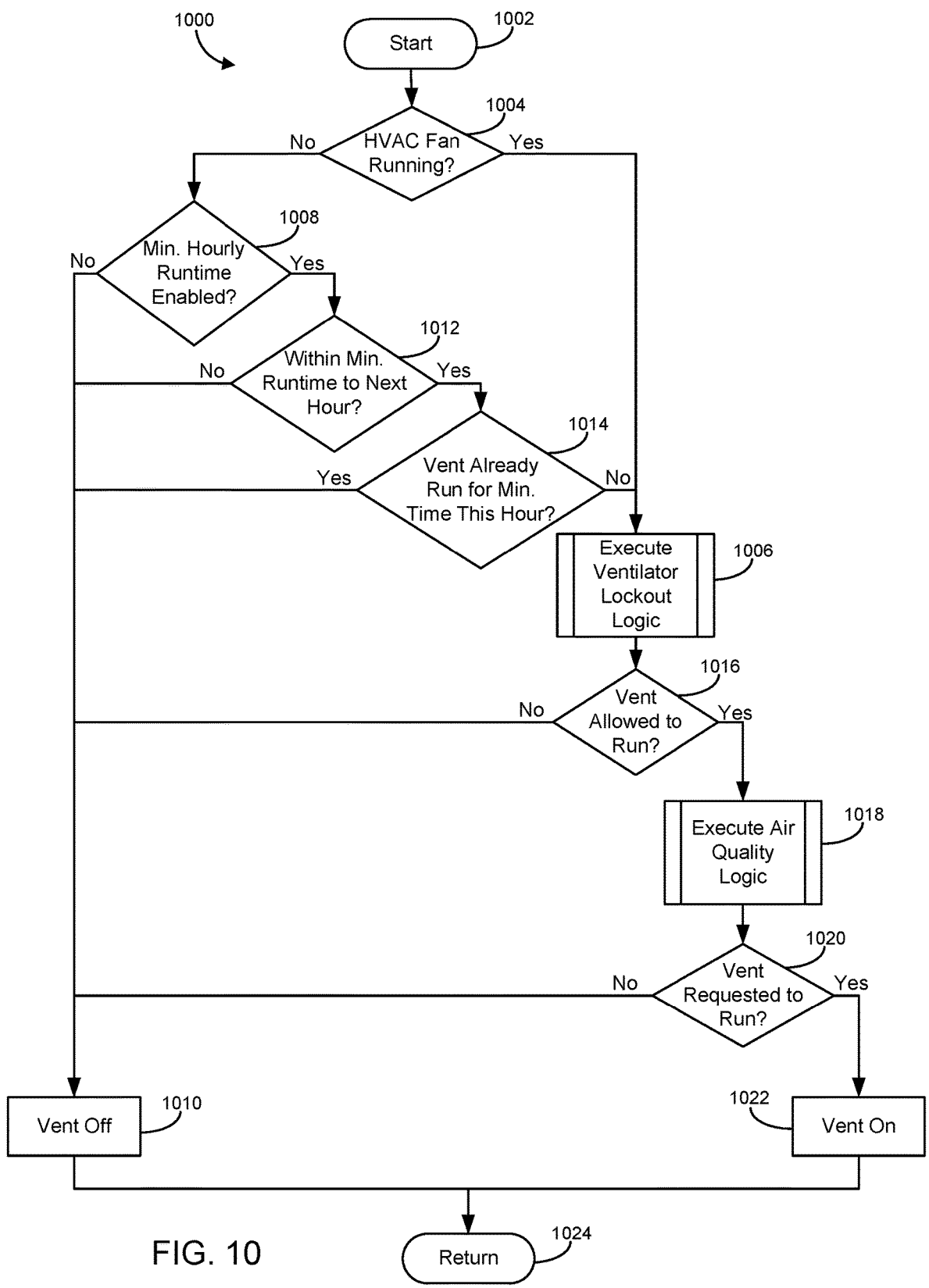
FIG. 10 is a flow diagram illustrating a process for controlling a ventilator of an HVAC system associated with the building of FIG. 8, according to some embodiments.

Turning now to FIG. 10, a process 1000 for controlling the ventilator 808 is shown, according to some embodiments. In systems including both a blower fan 806 and a ventilator 808, the fan 806 may be operated in conjunction with the ventilator 808. In some embodiments, the control device 214 may require the blower fan 806 to operate when the ventilator 808 is in operation. In other embodiments, a user may instruct the control device 214 to operate the blower 806 when the ventilator 808 is in operation. The process 1000 may start at process block 1002. In one embodiment, the process 1000 is controlled by the control device 214. Specifically, the process 1000 may be controlled by the ventilator control module 746 of the control device 214. At process block 1004, the ventilator control module 746 may determine if an HVAC fan is currently running. In some embodiments, the HVAC fan is the blower fan 806. If the ventilator control module 746 determines that a fan is currently running, process 1000 advances to process block 1006 to a execute ventilator lockout logic process 1100. Further details of the ventilator lockout logic process 1100 are included below with reference to FIG. 11. Returning to process block 1004, if the ventilator control module 746 determines that an HVAC fan is not currently running, process 1000 may advance to process block 1008.

At process block 1008, the control device 214 may determine if a minimum hourly runtime of the ventilator 808 is enabled. The ventilator minimum hourly runtime instructs the ventilator 808 to run for a minimum amount of time each hour. Running the ventilator 808 for a minimum amount of time each hour may be performed to provide fresh (e.g. outside) air flow throughout the building 800 consistently throughout the day. If the ventilator minimum hourly runtime is not enabled, the ventilator may remain in an off condition at process block 1010, and the process 1000 may end at process block 1024.

If the ventilator minimum hourly runtime is determined to be enabled at process block 1008, the control device 214 determines if the operation of the ventilator 808 would be within the minimum runtime to the next hour, at process block 1012. For example, if the minimum runtime per hour is ten minutes, the 'check' at process block 1012 would determine a "Yes" within ten minutes of the hour (e.g. between XX:50 and XX:00 of the hour). If the minimum runtime is determined not to be within the current hour, the ventilator remains in an off condition at process block 1010. If the operation of the ventilator is within the minimum runtime to the next hour, the control device 214 determines if the ventilator 808 has already been in operation for the minimum amount of time during the past hour, at process block 1014. For example, the minimum amount of time may be ten minutes. In other example, the minimum operation time may be more than ten minutes or less than ten minutes. Further, in some examples, the control device 214 may evaluate the operation of the ventilator 808 to determine if had been run for more than a minimum time within other time periods. While the above example time period is one hour, in other examples, the time period may be more than one hour or less than one hour.

If the ventilator 808 has already been run for the minimum amount of time for the last hour, the ventilator may remain in an off condition as process 1000 advances to process block 1010. If the ventilator 808 has not already been run for the minimum time in the last hour, process 1000 proceeds to process block 1006. A ventilator lockout logic process 1100 may be executed at process block 1006. As described above, the ventilator lockout logic process 1100 will be described in more detail below with reference to FIG. 11. In one embodiment, the ventilator lockout logic process 1000 is executed by the ventilator control module 746. The output of the ventilator lockout logic process 1000 is a determination of whether the ventilator 808 is allowed to run or not. At process block 1016, if the ventilator lockout logic process 1100 determines that the ventilator 808 is not allowed to run, the ventilator remains in an off condition at process block 1010. If, at process block 1006, the ventilator lockout logic process 1100 determines that the ventilator 808 is allowed to run, an air quality control logic process 1200 is executed at process block 1018. In one embodiment, the air quality control logic process 1200 is executed by the internal air quality module 748. The output of the air quality control logic process 1200 is a determination of whether the ventilator hourly runtime should be enabled. At process block 1020, the control device 214 determines if the ventilator 808 was requested to run. If the ventilator 808 was not requested to run, the ventilator remains in an off condition as process 1000 advances to process block 1010. If the ventilator is requested to run, the ventilator 808 may be run at process block 1022 before process 1000 is completed at process block 1024.

Figure 11:
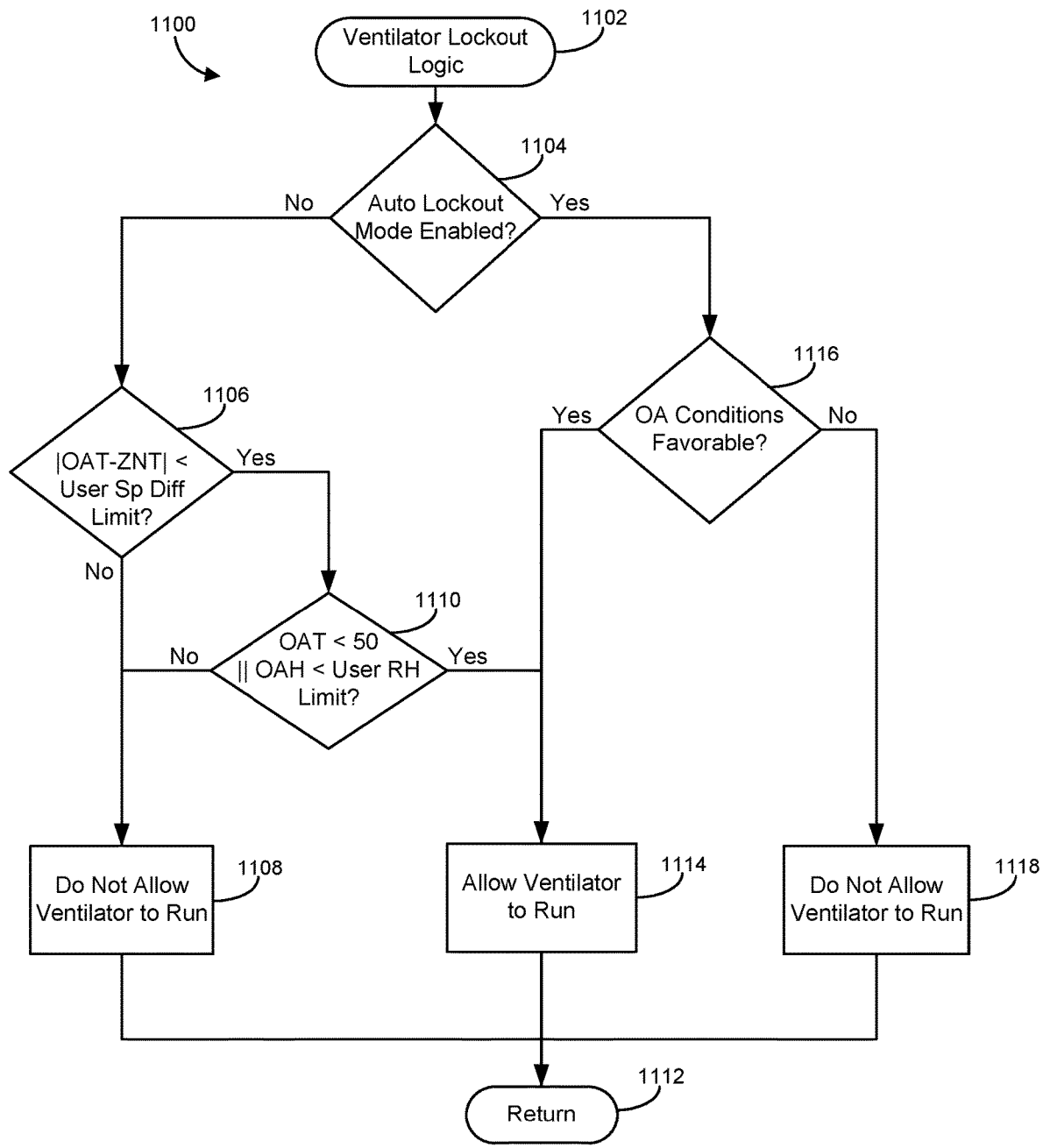
FIG. 11 is a flow diagram illustrating a ventilator lockout logic process, according to some embodiments.

Turning now to FIG. 11, a flow chart is shown illustrating the ventilator lockout logic process 1100. The process 1100 may start at process block 1102, and at process block 1104 it is determined whether an automatic lockout mode has been enabled. The ventilator 808 can operate in either a manual lockout mode or an automatic lockout mode. The automatic lockout mode can allow the control device 214 to automatically determine when to run the ventilator 808 in order to maximize air quality and minimize energy usage. When disabled, a user may have absolute control over when the ventilator can run. However, as described below, if the difference between the indoor and outdoor temp is too large, or the humidity is too high outside, then the ventilator 808 may not be able to run regardless of whether the indoor air quality is poor or the indoor humidity is high.

If the automatic lockout mode has not been enabled at process block 1104, process 1100 advances to process block 1106. At process block 1106, the control device 214 determines if the absolute value of the difference between the outside air temperature (OAT) and a zone temperature (ZNT) is less than a predefined user specific difference limit. If the absolute value of the difference between the outside air temperature (OAT) and a zone temperature (ZNT) is not less than a predefined user specific difference limit, the ventilator 808 is instructed not to run at process block 1008. If the absolute value of difference between the outside air temperature (OAT) and a zone temperature (ZNT) is less than a predefined user specific difference limit, process 1100 advances to process block 1110. At process block 1110, the control device 214 determines if the outside air conditions are favorable for dehumidification using ventilation. For example, in some embodiments, the control device 214 may determine that conditions are favorable when the outside air temperature is less than 50° F., or the outside air humidity (OAH) is less than a predefined user relative humidity (RH) limit. In some embodiments, the predefined user relative humidity may be fifty percent. However, humidity values of less than fifty percent or greater than fifty percent may also be used. By evaluating whether the outside air temperature is less than 50° F., psychrometric effects can be accounted for. Psychrometric effects can affect humidity measurements as low temperatures may have a higher RH. For example, eighty percent humidity at 50° F. has the same water content as approximately thirty-five percent at 68° F. If neither the outside air temperature is less than 50° F., nor the outside air humidity (OAH) is less than a predefined user relative humidity (RH) limit, the ventilator 808 is instructed not to run at process block 1108. The process 1100 may then return to process block 1006 of process 1000, at process block 1112. In some embodiments, process block 1106 also includes a determination of the ZNT. For example, if the ZNT is less than 50° F. or greater than 90° F., the ventilator 808 is instructed not to run at process block 1008 due to safety reasons.

If either the outside air temperature is less than 50° F., or the outside air humidity (OAH) is less than a predefined user relative humidity (RH) limit the ventilator is allowed to run at process block 1114. The process 1100 may then return to process block 1006 of process 1000, at process block 1112. Returning now to process block 1104, if the automatic lockout mode is determined to be enabled, process 1100 advances to process block 1116. At process block 1116, the control device 214 determines whether the outside air conditions are favorable for operating the ventilator. Process block 1116 may include any suitable algorithm that permits the ventilator to run when it has a negligible impact on energy usage, or when the energy impact is outweighed by the benefits of air quality improvement and/or ability to control humidity. If the control device 214 determines that the OA conditions are favorable, the ventilator 808 is allowed to run at process block 1114. Conversely, if the control device 214 determines that the OA conditions are not favorable, the ventilator 808 is instructed not to run at process block 1118. In either case, the process 1100 may then return to process block 1006 of process 1000, at process block 1112.

Figure 12:
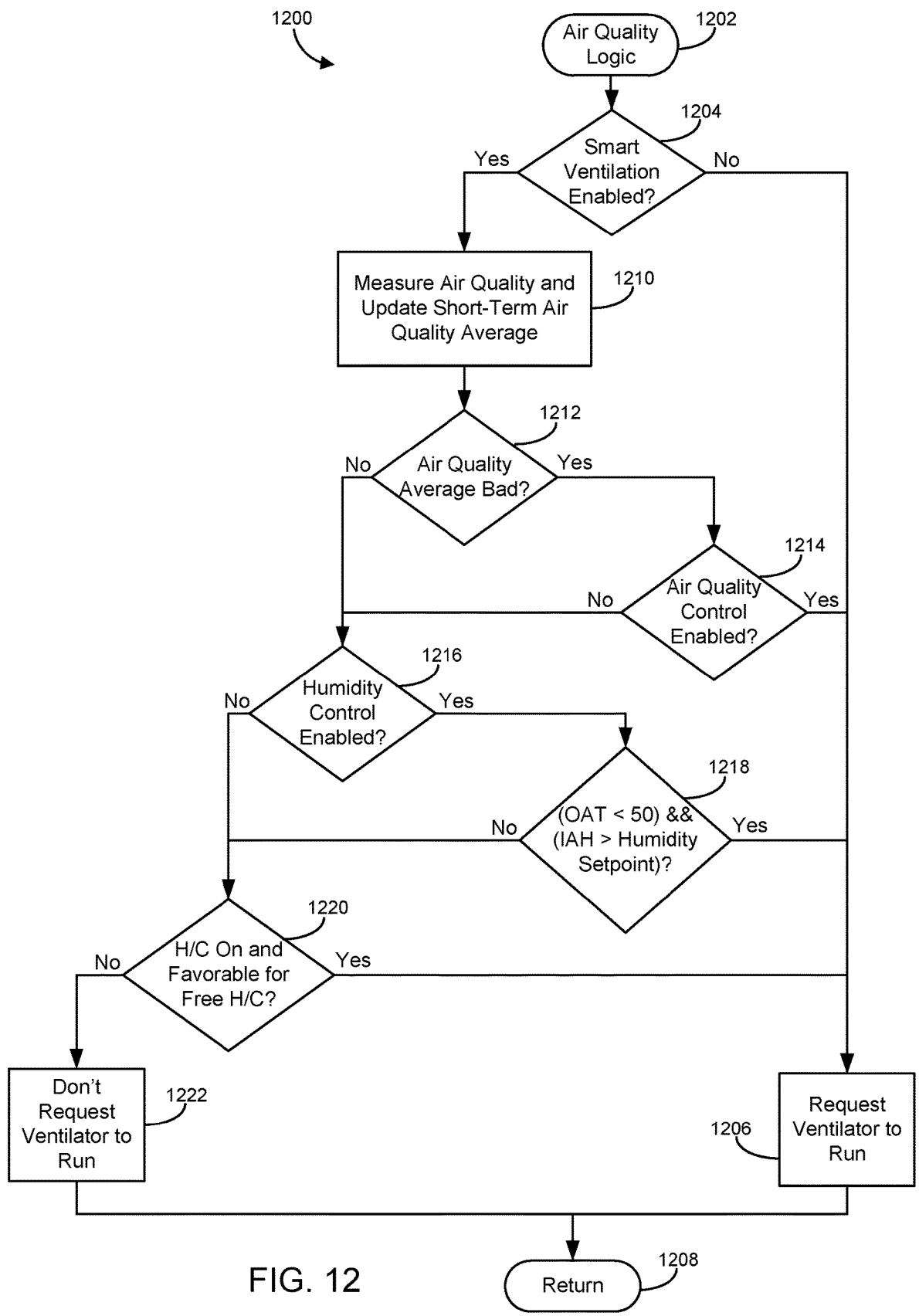
FIG. 12 is a flow diagram illustrating a ventilator with indoor air quality and dehumidifier logic process, according to some embodiments.

Turning now to FIG. 12, a flow chart illustrating the air quality control logic process 1200 is shown, according to some embodiments. The process 1200 can start at process block 1202. At process 1204, the control device 214 determines if a smart ventilation mode is enabled. The smart ventilation mode determines whether control of the ventilator 808 is required based on an indoor air quality setpoint and an indoor air quality reading. If smart ventilation mode is not enabled, process 1200 advances to process block 1206, and the ventilator 808 is requested to run. If smart ventilation mode is enabled, process 1200 advances to process block 1200.

At process block 1210 the indoor air quality is measured and a short term air quality average is updated. In some embodiments, the indoor air quality module 748 of the control device 214 may determine the short term air quality average. In one embodiment, the air quality may be measured by the indoor sensors 802. In further embodiments, the outdoor sensors 804 may also be used to measure air quality. In some embodiments, the control device 214 updates the short term air quality average. At process block 1212 it is determined whether the short term air quality average is bad. A determination that the short term air quality average is bad may be based on evaluating certain measured air quality values. For example, VOC levels, CO2 levels, pollen levels, particulate levels, humidity, temperature and/or other values may be evaluated to determine the short term air quality average. These values may be compared against predefined threshold levels, which can provide an indication of whether the short term air quality average is good or bad. For example, where none of the measured values exceeds the predefined threshold levels, the short term air quality may not be determined to be bad. In contrast, if one or more of the measured values exceeds a threshold value, the short term air quality average may be determined to be bad. In some embodiments, a certain number of measured values may need to exceed the predefined thresholds for the short term air quality to be considered bad. In some embodiments, the various air quality values may be evaluated to generate an average air quality "score." The score may be a numerical value (e.g. 1-100), an alphabetical value (e.g. A-F), or other representative value. The score may then be used to determine whether the air quality average is good or bad. For example, using a numerical value scoring system where zero is the highest air quality score (e.g. best air quality), and one hundred is the lowest air quality score (e.g. worst air quality), a score above fifty may indicate that the air quality average is "bad." However, it is contemplated that other scores may be used to determine whether the air quality average is good or bad.

If the short term air quality average is not determined to be bad at process block 1212, the control device 214 determines if a humidity control mode is enabled at process block 1216. If the humidity control mode 1216 is not enabled, process 1200 advances to process block 1220. At process block 1220, the control device 214 determines whether heating or cooling is active and outdoor conditions relative to indoor conditions are favorable to achieve free heating or cooling. If so, the ventilator 808 is requested to run at process block 1106. If heating or cooling is not active and/or outdoor conditions relative to indoor conditions are not favorable to achieve free heating or cooling, the ventilator 808 is not requested to run at process block 1222. The process 1200 then returns to process block 1018 of process 1000, at process block 1208.

Returning to process block 1216, if the humidity control mode is enabled, the control device 214 determines if the outdoor air temperature is less than 50° F., and if the indoor ambient humidity (IAH) is greater than a humidity setpoint at process block 1218. If the outdoor air temperature is not less than 50° F. or the indoor ambient humidity is not greater than a humidity setpoint, process 1200 advances to process block 1220 to determine whether heating or cooling is active and indoor conditions are favorable to achieve free heating or cooling. If, however, the outdoor air temperature is less than 50° F. and the indoor ambient humidity is greater than the humidity setpoint, the ventilator 808 is requested to run at process block 1206. The process 1200 then returns to process block 1018 of process 1000, at process block 1208.

Returning now to process block 1212, if the indoor short term air quality average is determined to be bad, the control device 214 determines if an air quality control mode is enabled at process block 1214. If the air quality control mode is not enabled, the process 1200 proceeds to process block 1216 and proceeds as described above. If the air quality control mode is determined to be enabled at process block 1214, the ventilator 808 is requested to run at process block 1206. The process 1200 may then return to process block 1018 of process 1000, at process block 1208.

Configuration of Exemplary Embodiments

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. An HVAC system within a building, comprising:
   an HVAC device comprising a blower fan;
   a plurality of sensors; and
   a control device, the control device comprising a processor configured to:
   receive a request to operate the blower fan;
   receive occupancy information indicating the building is occupied;
   determine a minimum runtime mode of the blower fan is enabled based on a determination that a smart circulation mode of the blower fan is disabled, the minimum runtime mode configured to operate the blower fan based on a runtime of the blower fan within a previous time frame; and
   operate the blower fan based on the runtime of the blower fan within the previous time frame and the occupancy information.

2. The HVAC system of claim 1, wherein the control device is a thermostat.

3. The HVAC system of claim 1, further comprising a ventilator configured to ventilate outside air into the building.

4. The HVAC system of claim 3, wherein the processor is further configured to operate the ventilator in parallel with the blower fan, wherein the operation of the ventilator is based on a difference of two or more measured conditions being less than a user specified difference limit.

5. The HVAC system of claim 4, wherein the measured conditions are an outdoor air temperature and a zone temperature.

6. The HVAC system of claim 3, wherein the processor is further configured to:
    determine an indoor air quality average;
    operate the ventilator in parallel with the blower fan based on the indoor air quality average being determined to be below an predetermined threshold.

7. The HVAC system of claim 3, wherein the processor is further configured to operate the ventilator to control a humidity level of within the building.

8. The HVAC system of claim 1, wherein the plurality of sensors includes an indoor sensor and an outdoor sensor.

9. The HVAC system of claim 8, wherein the indoor sensor is a volatile organic compound (VOC) sensor.

10. The HVAC system of claim 1, wherein the plurality of sensors includes one or more of a volatile organic compound (VOC) sensor, a carbon dioxide sensor, and a humidity sensor.

11. A method of operating a blower fan in an HVAC system within a building, the method comprising:
    receiving a request to operate the blower fan;
    receiving occupancy information indicating the building is occupied;
    determining a minimum runtime mode of the blower fan is enabled based on a determination that a smart circulation mode of the blower fan is disabled, the minimum runtime mode configured to operate the blower fan based on a runtime of the blower fan within a previous time frame; and
    operating the blower fan based on the runtime of the blower fan within the previous time frame and the occupancy information.

12. The method of claim 11, wherein the method is performed by a thermostat.

13. The method of claim 11, wherein a plurality of sensors of the HVAC system includes an indoor sensor and an outdoor sensor.

14. The method of claim 13, wherein the indoor sensor is a volatile organic compound (VOC) sensor.

15. The method of claim 11, wherein a plurality of sensors of the HVAC system includes one or more of a volatile organic compound (VOC) sensor, a carbon dioxide sensor, and a humidity sensor.

16. A thermostat configured to control a blower fan in an HVAC system within a building, wherein the thermostat comprises:
    a communications interface configured to receive one or more measurements from a plurality of sensors; and
    a processing circuit comprising a processor and memory, the processor configured to:
        receive a request to operate the blower fan;
        receive occupancy information indicating the building is occupied;
        operate the blower fan when an air quality value is determined to be above an acceptable value;
        determine a smart circulation mode of the blower fan is enabled, the smart circulation mode configured to override the request to operate the blower fan when an air quality value is determined to be above an acceptable value;
        determine a runtime of the blower fan within a previous time frame; and
        operate the blower fan based on the runtime.

17. The thermostat of claim 16, wherein the processor is further configured to determine the air quality value, wherein the air quality value is based on the one or more measurements from the plurality of sensors.

18. The thermostat of claim 17, wherein operating the blower fan is further based on the air quality value being determined to be below the acceptable value.

19. The thermostat of claim 16, wherein the processor is further configured to operate the blower fan based at least in part on the smart circulation mode and the occupancy information.

20. The thermostat of claim 17, wherein operating the blower fan is further based on the runtime of the blower fan within the previous time frame.

* * * * *